US007006642B1

(12) United States Patent
Kumai

(10) Patent No.: US 7,006,642 B1
(45) Date of Patent: Feb. 28, 2006

(54) AUDIO CONTROL APPARATUS AND AUDIO PROCESSING APPARATUS IN A MIXING SYSTEM

(75) Inventor: Yoshiya Kumai, Motsumoto (JP)

(73) Assignee: Roland Corporation, Hamamatsu (JP)

( * ) Notice: Subject to any disclaimer, the term of this patent is extended or adjusted under 35 U.S.C. 154(b) by 1373 days.

(21) Appl. No.: 09/585,953

(22) Filed: Jun. 2, 2000

(30) Foreign Application Priority Data

Jun. 4, 1999 (JP) ................................ 11-157346
Jun. 4, 1999 (JP) ................................ 11-157414

(51) Int. Cl.
*H04B 1/00* (2006.01)

(52) U.S. Cl. .......................................... 381/119; 369/4

(58) Field of Classification Search ................ 381/119, 381/104, 107, 109, 56, 58; 369/3, 4; 700/94
See application file for complete search history.

(56) References Cited

U.S. PATENT DOCUMENTS 5,553,220 A * 9/1996 Keene ........................ 345/520
5,915,029 A * 6/1999 Yazurlo et al. ............... 381/58
5,917,781 A * 6/1999 Kim .............................. 369/4
6,028,526 A * 2/2000 Mercs ..................... 340/815.4
6,097,819 A * 8/2000 Chang et al. ................. 381/58
6,195,439 B1 * 2/2001 Fukui ......................... 381/104
6,757,302 B1 * 6/2004 Lydon et al. ............... 370/503
2004/0133291 A1 * 7/2004 Nakayama et al. ........... 700/94

* cited by examiner

*Primary Examiner*—Xu Mei
(74) *Attorney, Agent, or Firm*—Foley & Lardner LLP

(57) ABSTRACT

An audio mixing system is disclosed which makes it possible, when the transmission path that was disconnected is reconnected, to carry out processing in which the control parameters for setting the audio processing apparatus are transmitted to the audio processing apparatus from the audio control apparatus and processing with which visual confirmation that the connection has been made again is provided to the user. It has a detection means in which a specified signal is transmitted in the transmission path that is used for transmitting and the fact that the loop connection of the transmission path has been completed is detected by means of the reception by the transmission path used for reception of the signal that corresponds to the specified signal that has been transmitted, and a change instruction means in which the state of the control is changed in conformance with the operation of a specified operator and, based on the control state that has been instructed by said change, a signal to carry out the control instruction is transmitted on the transmission path used for transmitting, and a transmission means in which, in the case where the fact that the loop connection of the transmission path has been completed has been detected by the detection means, the signal to carry out the control instruction based on the most recent control state in accordance with the change instruction means is transmitted on the transmission path that is used for transmission.

38 Claims, 18 Drawing Sheets

FIG. 6

THE CASE WHERE THE DEDICATED TRANSMISSION PATH FOR RECEPTION (INPUT) OF THE FIRST CONSOLE HAS BEEN DISCONNECTED

| FIRST CONSOLE (MASTER) | FIRST PROCESSOR (SLAVE) | SECOND CONSOLE (SLAVE) | SECOND PROCESSOR (SLAVE) |
|---|---|---|---|
| INPUT DISCONNECTION DETECTION<br>SWITCH TO THE BUILT-IN CLOCK<br>DISCONNECTION DISPLAY<br>TRANSMISSION OF THE DISCONNECTION MSG. | | | |
| | RECEPTION OF THE DISCONNECTION MSG.<br>TRANSMISSION OF THE DISCONNECTION MSG. | | |
| | | RECEPTION OF THE DISCONNECTION MSG.<br>DISCONNECTION DISPLAY<br>TRANSMISSION OF THE DISCONNECTION MSG. | |
| | | | RECEPTION OF THE DISCONNECTION MSG.<br>TRANSMISSION OF THE DISCONNECTION MSG. |

THE CASE WHERE THE DEDICATED TRANSMISSION PATH FOR RECEPTION (INPUT) OF THE FIRST PROCESSOR HAS BEEN DISCONNECTED

| FIRST CONSOLE (MASTER) | FIRST PROCESSOR (SLAVE) | SECOND CONSOLE (SLAVE) | SECOND PROCESSOR (SLAVE) |
|---|---|---|---|
| | INPUT DISCONNECTION DETECTION<br>SWITCH TO THE BUILT-IN CLOCK<br>DISCONNECTION DISPLAY<br>TRANSMISSION OF THE DISCONNECTION MSG. | | |
| | | RECEPTION OF THE DISCONNECTION MSG.<br>DISCONNECTION DISPLAY<br>TRANSMISSION OF THE DISCONNECTION MSG. | |
| | | | RECEPTION OF THE DISCONNECTION MSG.<br>TRANSMISSION OF THE DISCONNECTION MSG. |
| RECEPTION OF THE DISCONNECTION MSG.<br>DISCONNECTION DISPLAY<br>TRANSMISSION OF THE DISCONNECTION MSG. | | | |

FIG. 7

THE CASE WHERE THE DEDICATED TRANSMISSION PATH FOR RECEPTION (INPUT) OF THE SECOND CONSOLE HAS BEEN DISCONNECTED

| FIRST CONSOLE (MASTER) | FIRST PROCESSOR (SLAVE) | SECOND CONSOLE (SLAVE) | SECOND PROCESSOR (SLAVE) |
|---|---|---|---|
| | | INPUT DISCONNECTION DETECTION<br>SWITCH TO THE BUILT-IN CLOCK<br>DISCONNECTION DISPLAY<br>TRANSMISSION OF THE DISCONNECTION MSG. | |
| | | | RECEPTION OF THE DISCONNECTION MSG.<br>TRANSMISSION OF THE DISCONNECTION MSG. |
| RECEPTION OF THE DISCONNECTION MSG.<br>DISCONNECTION DISPLAY<br>TRANSMISSION OF THE DISCONNECTION MSG. | | | |
| | RECEPTION OF THE DISCONNECTION MSG.<br>TRANSMISSION OF THE DISCONNECTION MSG. | | |

THE CASE WHERE THE DEDICATED TRANSMISSION PATH FOR RECEPTION (INPUT) OF THE SECOND PROCESSOR HAS BEEN DISCONNECTED

| FIRST CONSOLE (MASTER) | FIRST PROCESSOR (SLAVE) | SECOND CONSOLE (SLAVE) | SECOND PROCESSOR (SLAVE) |
|---|---|---|---|
| | | | INPUT DISCONNECTION DETECTION<br>SWITCH TO THE BUILT-IN CLOCK<br>DISCONNECTION DISPLAY<br>TRANSMISSION OF THE DISCONNECTION MSG. |
| RECEPTION OF THE DISCONNECTION MSG.<br>DISCONNECTION DISPLAY<br>TRANSMISSION OF THE DISCONNECTION MSG. | | | |
| | RECEPTION OF THE DISCONNECTION MSG.<br>TRANSMISSION OF THE DISCONNECTION MSG. | | |
| | | RECEPTION OF THE DISCONNECTION MSG.<br>DISCONNECTION DISPLAY<br>TRANSMISSION OF THE DISCONNECTION MSG. | |

(1) THE CASE WHERE THE DEDICATED TRANSMISSION PATH FOR RECEPTION (INPUT) OF THE FIRST CONSOLE HAS BEEN CONNECTED

| FIRST CONSOLE (MASTER) | FIRST PROCESSOR (SLAVE) | SECOND CONSOLE (SLAVE) | SECOND PROCESSOR (SLAVE) |
|---|---|---|---|
| INPUT CONNECTION DETECTION<br>SYNCHRONOUS SWITCH-OVER TO EXTERNAL CLOCK<br>TRANSMISSION OF THE CONNECTION CONFIRMATION MSG. | | | |
| | RECEPTION OF THE CONNECTION CONFIRMATION MSG.<br>TRANSMISSION OF THE CONNECTION CONFIRMATION MSG. | | |
| | | RECEPTION OF THE CONNECTION CONFIRMATION MSG.<br>TRANSMISSION OF THE CONNECTION CONFIRMATION MSG. | |
| | | | RECEPTION OF THE CONNECTION CONFIRMATION MSG.<br>TRANSMISSION OF THE CONNECTION CONFIRMATION MSG. |
| RECEPTION OF THE CONNECTION CONFIRMATION MSG.<br>TRANSMISSION OF THE CONFIRMATION COMPLETION MSG.<br>CONNECTION DISPLAY<br>CARRY OUT CONNECTION PROCESSING? | | | |
| | | | |

A/B

A/B

FIG. 9A (2) THE CASE WHERE THE DEDICATED TRANSMISSION PATH FOR RECEPTION (INPUT) OF THE FIRST PROCESSOR HAS BEEN CONNECTED

| FIRST CONSOLE (MASTER) | FIRST PROCESSOR (SLAVE) | SECOND CONSOLE (SLAVE) | SECOND PROCESSOR (SLAVE) |
|---|---|---|---|
| | INPUT CONNECTION DETECTION<br>SYNCHRONOUS SWITCH-OVER TO EXTERNAL CLOCK<br>TRANSMISSION OF THE CONNECTION CONFIRMATION MSG. | | |
| | | RECEPTION OF THE CONNECTION CONFIRMATION MSG.<br>TRANSMISSION OF THE CONNECTION CONFIRMATION MSG. | |
| | | | RECEPTION OF THE CONNECTION CONFIRMATION MSG.<br>TRANSMISSION OF THE CONNECTION CONFIRMATION MSG. |
| RECEPTION OF THE CONNECTION CONFIRMATION MSG.<br>TRANSMISSION OF THE CONNECTION CONFIRMATION MSG. | | | |
| | RECEPTION OF THE CONNECTION CONFIRMATION MSG.<br>TRANSMISSION OF THE CONFIRMATION COMPLETION MSG. | | |
| | | | |

A/B

A/B

FIG. 10A (3) THE CASE WHERE THE DEDICATED TRANSMISSION PATH FOR RECEPTION (INPUT) OF THE SECOND CONSOLE HAS BEEN CONNECTED

| FIRST CONSOLE (MASTER) | FIRST PROCESSOR (SLAVE) | SECOND CONSOLE (SLAVE) | SECOND PROCESSOR (SLAVE) |
|---|---|---|---|
| | | INPUT CONNECTION DETECTION<br>SYNCHRONOUS SWITCH-OVER TO EXTERNAL CLOCK<br>TRANSMISSION OF THE CONNECTION CONFIRMATION MSG. | |
| | | | RECEPTION OF THE CONNECTION CONFIRMATION MSG.<br>TRANSMISSION OF THE CONNECTION CONFIRMATION MSG. |
| RECEPTION OF THE CONNECTION CONFIRMATION MSG.<br>TRANSMISSION OF THE CONNECTION CONFIRMATION MSG. | | | |
| | RECEPTION OF THE CONNECTION CONFIRMATION MSG.<br>TRANSMISSION OF THE CONNECTION CONFIRMATION MSG. | | |
| | | RECEPTION OF THE CONNECTION CONFIRMATION MSG.<br>TRANSMISSION OF THE CONFIRMATION COMPLETION MSG.<br>CONNECTION DISPLAY<br>CARRY OUT CONNECTION PROCESSING? | |

A/B

A/B

FIG. 11A (4) THE CASE WHERE THE DEDICATED TRANSMISSION PATH FOR RECEPTION (INPUT) OF THE SECOND PROCESSOR HAS BEEN CONNECTED

| FIRST CONSOLE (MASTER) | FIRST PROCESSOR (SLAVE) | SECOND CONSOLE (SLAVE) | SECOND PROCESSOR (SLAVE) |
|---|---|---|---|
| | | | INPUT CONNECTION DETECTION<br>SYNCHRONOUS SWITCH-OVER TO EXTERNAL CLOCK<br>TRANSMISSION OF THE CONNECTION CONFIRMATION MSG. |
| RECEPTION OF THE CONNECTION CONFIRMATION MSG.<br>TRANSMISSION OF THE CONNECTION CONFIRMATION MSG. | | | |
| | RECEPTION OF THE CONNECTION CONFIRMATION MSG.<br>TRANSMISSION OF THE CONNECTION CONFIRMATION MSG. | | |
| | | RECEPTION OF THE CONNECTION CONFIRMATION MSG.<br>TRANSMISSION OF THE CONNECTION CONFIRMATION MSG. | |
| | | | RECEPTION OF THE CONNECTION CONFIRMATION MSG.<br>TRANSMISSION OF THE CONFIRMATION COMPLETION MSG. |
| | | | |

A/B A/B

FIG. 12A

THE CASE WHERE THE USER HAS ANSWERED "YES" TO "CARRY OUT CONNECTION PROCESSING?" IN THE FIRST CONSOLE

| FIRST CONSOLE (MASTER) | FIRST PROCESSOR (SLAVE) | SECOND CONSOLE (SLAVE) | SECOND PROCESSOR (SLAVE) |
|---|---|---|---|
| INPUT TO CARRY OUT CONNECTION PROCESSING<br>TRANSMISSION OF THE CONNECTION MSG.<br>TRANSMISSION OF THE CONTROL PARAMETERS (1) | | | |
| | RECEPTION OF THE CONNECTION MSG.<br>TRANSMISSION OF THE CONNECTION MSG.<br>RECEPTION OF THE CONTROL PARAMETERS (1)<br>TRANSMISSION OF THE CONTROL PARAMETERS (1) | | |
| | | RECEPTION OF THE CONNECTION MSG.<br>TRANSMISSION OF THE CONNECTION MSG.<br>RECEPTION OF THE CONTROL PARAMETERS (1)<br>TRANSMISSION OF THE CONTROL PARAMETERS (1)<br>TRANSMISSION OF THE CONTROL PARAMETERS (2) | |

A/B

A/B

FIG. 13A

AUDIO CONTROL APPARATUS AND AUDIO PROCESSING APPARATUS IN A MIXING SYSTEM

CROSS-REFERENCE TO RELATED APPLICATIONS

Embodiments of the present invention relate to and claim priority to Japanese Patent Application No. Hei 11-157414, filed Jun. 4, 1999, and Japanese Patent Application No. Hei 11-157346, filed Jun. 4, 1999. The content of these applications are incorporated by reference herein.

BACKGROUND OF THE INVENTION

1. Field of the Invention

The present invention relates to an audio control apparatus and an audio processing apparatus in a mixing system. More specifically, it relates to an audio control apparatus and an audio processing apparatus in a mixing system that is configured such that the audio control apparatus that directs the control of an audio signal and the audio processing apparatus that mixes and processes the audio signals based on the control instructions from said audio control apparatus are physically separated and it is possible to place them separately in different locations and that is configured such that one or more of the audio control apparatuses and one or more of the audio processing apparatuses are connected by a plurality of transmission paths in a loop with which the signals are transmitted in one direction.

2. Description of the Related Art

For some time, mixing systems have been known in which the audio signals of a plurality of channels are input, the audio signals of the plurality of channels that have been input are controlled in conformance with the audio levels that have been set for each of the channels, mixing processing is carried out and they are output.

In general, this kind of prior art mixing system comprises an audio control section in which the control of the audio levels of the audio signals is directed and an audio processing section with which the mixing processing of the audio signals is done based on the control instructions of said audio control section and these are physically a single unit.

In addition, when a prior art mixing system such as that described above in which the audio control section and the audio processing section are physically in a single unit is used in a performance venue, or the like, it is common that it is used set up in such places as the rear of the performance venue such that the user can immediately confirm the mixing effect and, together with this, such that it does not interfere with such things as the performance that is carried out on the stage that is in the front of the performance venue.

Accordingly, there has been a problem that, in order to connect such resources as a microphone or electric guitar that are placed on the stage in the front of the performance venue with the mixing system that has been placed in the rear of the performance venue, it is necessary to extend cables from the stage, which is in the front of the performance venue, to the mixing system that has been placed in the rear of the performance venue in a number that corresponds to the number of resources and the work to lay the cables is extremely complex.

On the other hand, a mixing system has been proposed that is equipped with an audio control apparatus with which the control of the audio signal is directed and an audio processing apparatus with which the mixing processing of the audio signals is done based on the control instructions from the audio control apparatus and it is configured with both apparatuses connected via a transmission path.

In other words, since this mixing system is configured with the audio control apparatus and the audio processing apparatus organized as separate units physically and connected via a transmission path, it is possible to place the audio control apparatus and the audio processing apparatus separated in different locations.

Accordingly, with this kind of prior art mixing system that is configured such that the audio control system and the audio processing system are physically separated and it is possible to place them separately in different locations, the audio processing system to which the cables from such resources as a microphone or an electric guitar can be placed in the vicinity of the stage which is in the front of the performance venue and, on the other hand, the audio control system can be placed in the rear of the performance venue. It is set up such that the audio processing system and the audio control system are connected by a cable between them and the control parameters are supplied to the audio processing apparatus from the audio control apparatus. It is possible to use it such that mixing processing is carried out in the audio processing apparatus based on the setting conditions in accordance with the control parameters.

However, with a prior art mixing system that is configured with the audio control apparatus and the audio processing apparatus physically separated, in a case where there has been a disconnection of the transmission path with which the audio control apparatus and the audio processing apparatus are connected due to such things as the pulling out of the plug for the transmission path and the connecting section of the audio control apparatus or the audio processing apparatus, it is necessary to do such things as to again insert the plug for the transmission path into said connecting section of the audio control apparatus or the audio processing apparatus and to again make the connection of the transmission path between the audio control apparatus and the audio processing apparatus.

In addition, in the manner described above, in a case in which the connection has again been made following the disconnection of the transmission path, there has been a problem in that it is not possible for the user to confirm that the connection has again been made.

Furthermore, since, in the disconnected state, the control parameters that have been transmitted from the audio control apparatus are not supplied to the audio processing apparatus, there has been a problem that, even though the connection is made again, the intentions of the user who operates the audio control apparatus are not reflected in that way by the audio processing apparatus.

SUMMARY OF THE DISCLOSURE

The present invention was developed taking into consideration the problems that are inherent in the prior art such as those mentioned above. It presents an audio control apparatus and an audio processing apparatus in a mixing system in which the mixing system is configured such that the audio control apparatus that directs the control of the audio signal and the audio processing apparatus that mixing processes the audio signal based on the control instructions from said audio control apparatus are physically separated and, together with being configured such that the audio control apparatus and the audio processing apparatus are connected via a transmission path, it is possible to arrange the two such that they are placed separately in different locations. It is possible when a transmission path that has been disconnected is connected again, to transmit the control parameters for setting the audio processing apparatus from the audio control apparatus to the audio processing apparatus and do the processing and to carry out processing in which the reconnection can be visually confirmed by the user.

In order to achieve the above objective, the invention cited in claim 1 of the present invention is one in which an audio control apparatus in a mixing system that is configured such that the audio control apparatus that directs the control of an audio signal and an audio processing apparatus that mixes and processes the audio signals based on the control instructions from the audio control apparatus are physically separated and it is possible to place them separately in different locations and that is configured such that one or more of the audio control apparatuses and one or more of the audio processing apparatuses are connected by a plurality of transmission paths in a loop with which the signals are transmitted in one direction, the audio control apparatus has a detection means in which a specified signal is transmitted in the transmission path that is used for transmitting and the fact that the loop connection of the transmission path has been completed is detected by means of the reception by the transmission path used for reception of the signal that corresponds to the specified signal that has been transmitted, and a change instruction means in which the state of the control is changed in conformance with the operation of a specified operator and, based on the control state that has been instructed by said change, a signal to carry out the control instruction is transmitted on the transmission path used for transmitting, and a transmission means in which, in the case where the fact that the loop connection of the transmission path has been completed has been detected by the detection means, the signal to carry out the control instruction based on the most recent control state in accordance with the change instruction means is transmitted on the transmission path that is used for transmission.

Accordingly, in accordance with the invention cited in claim 1 of the present invention, since the signal with which the direction of control is carried out that has been transmitted by the audio control apparatus in the period of time that the loop of the transmission path is not connected is transmitted again to the audio processing apparatus when the connection of the loop of the transmission path has been completed, the intention of the user to operate the audio control apparatus during the time that the loop of the transmission path is not connected is reflected by the audio processing apparatus.

In addition, in the transmission means, it may be set up such that in the case where the completion of the connection of the loop has been detected, whether or not the user has made a control instruction is ascertained and when the user has specified that a control instruction be carried out, the signal to carry out the control instruction is transmitted or, it may be set up such that the transmission of the control instruction is carried out automatically without ascertaining whether or not the user has made a control instruction.

In addition, the invention cited in claim 2 of the present invention is one in which for an audio control apparatus in a mixing system that is configured such that the audio control apparatus that directs the control of an audio signal and an audio processing apparatus that mixes and processes the audio signals based on the control instructions from the audio control apparatus are physically separated and it is possible to place them separately in different locations and that is configured such that one or more of the audio control apparatuses and one or more of the audio processing apparatuses are connected by a plurality of transmission paths in a loop with which the signals are transmitted in one direction, the audio control apparatus has a detection means in which a specified signal is transmitted in the transmission path that is used for transmitting and the fact that the loop connection of the transmission path has been completed is detected by means of the reception by the transmission path used for reception of the signal that corresponds to the specified signal that has been transmitted, and a display means in which, in the case where the fact that the loop connection of the transmission path has been completed has been detected by the detection means, a specified display is made.

Accordingly, in accordance with the invention Cited in claim 2 of the present invention, since a specified display is made in the display means in response to the completion of the connection of the loop of the transmission path, it is possible for the user to visually ascertain that the connection of the loop of the transmission path has been completed.

In addition, the invention cited in claim 3 of the present invention is one in which for an audio control apparatus in a mixing system that is configured such that the audio control apparatus that directs the control of an audio signal and an audio processing apparatus that mixes and processes the audio signals based on the control instructions from the audio control apparatus are physically separated and it is possible to place them separately in different locations and that is configured such that two or more of the audio control apparatuses and one or more of the audio processing apparatuses are connected by a plurality of transmission paths in a loop with which the signals are transmitted in one direction, the audio control apparatus has a detection means in which a specified signal is transmitted in the transmission path that is used for transmitting and the fact that the loop connection of the transmission path has been completed is detected by means of the reception by the transmission path used for reception of the signal that corresponds to the specified signal that has been transmitted, and a transmission means in which, in the case where the fact that the loop connection of the transmission path has been completed has been detected by the detection means, a second specified signal that is different from the specified signal is transmitted on the transmission path that is used for transmitting.

Accordingly, in accordance with the invention cited in claim 3 of the present invention, a notification is made of the completion of the connection of a loop in an audio control apparatus other than the audio control apparatus with which the completion of the connection of the loop has been detected. By this means, with said other audio control apparatus, such things are possible as for the signal with which the control direction is carried out that has been transmitted during the time that the loop of the transmission path is not connected to be transmitted again to the audio processing apparatus when the connection of the loop of the transmission path has been completed and for the user to be able to visually ascertain that the connection of the loop of the transmission path has been completed.

In addition, the invention cited in claim 4 of the present invention is one in which for an audio processing apparatus in a mixing system that is configured such that an audio control apparatus that directs the control of an audio signal and the audio processing apparatus that mixes and processes the audio signals based on the control instructions from the audio control apparatus are physically separated and it is possible to place them separately in different locations and that is configured such that one or more of the audio control apparatuses and one or more of the audio processing apparatuses are connected by a plurality of transmission paths in a loop with which the signals are transmitted in one direction, the audio processing apparatus has a detection means in which a specified signal is transmitted in the transmission path that is used for transmitting and the fact that the loop connection of the transmission path has been completed is detected by means of the reception by the transmission path used for reception of the signal that corresponds to the specified signal that has been transmitted, and a transmission means in which, in the case where the fact that the loop connection of the transmission path has been completed has been detected by the detection means, a second specified signal that is different from the specified signal is transmitted on the transmission path that is used for transmitting.

Accordingly, in accordance with the invention cited in claim 4 of the present invention, in those cases where the completion of the loop connection has been detected in the signal processing apparatus, the fact that the loop connection has been completed is notified to the audio control apparatus also. Because of this, the transmission of the signal with which the control is directed that has been transmitted during the time that the loop of the transmission path is not connected can be transmitted again to the audio processing apparatus when the connection of the loop of the transmission path has been completed and it is possible for the user to visually ascertain that the connection of the loop of the transmission path has been completed, and so forth.

In addition, for the detection means, it may be set up such that, in the case where the specified signal itself has been received through the loop transmission path, the signal that has been received is handled as a signal that corresponds to the specified signal or, in a case where a signal that differs from the specified signal is transmitted by another apparatus in conformance with the receipt of a specified signal and the different signal has been received through the loop transmission path, the specified signal that has been received and the different signal are handled as signals that correspond to the specified signal.

In addition, the invention cited in claim 5 of the present invention is one in which in the audio control apparatus cited in one of claims 1, 2 or 3, the audio control apparatus is characterized in that in the detection means, the specified signal is transmitted on the transmission path that is used for transmitting due to the fact that a signal has been received by the transmission path that is used for receiving.

In addition, the invention cited in claim 6 of the present invention is one in which in the audio processing apparatus cited in claim 4, the audio processing apparatus is characterized in that in the detection means, the specified signal is transmitted on the transmission path that is used for transmitting due to the fact that a signal has been received by the transmission path that is used for receiving.

Accordingly, in accordance with the inventions cited in claim 5 as well as claim 6, it is set up such that the detection of the connection of the loop of the transmission path is started by the reception of the signal by the transmission path used for receiving. Because of this, even in a case where any of the transmission paths from among the loop transmission paths has been connected, the audio control apparatus or the audio processing apparatus that has been connected by the transmission path used for receiving from among the audio control apparatuses or the audio processing apparatuses in the mixing system that is configured connected in a loop and transmits a specified signal to the transmission path used for transmitting and the detection of the connection of the loop of the transmission path is started.

BRIEF DESCRIPTION OF THE DRAWINGS

FIG. 6 is a status change diagram for the first console (the master), the first processor, the second console (slave) and the second processor in the disconnection detection processing and the disconnection message reception processing in a case where, for the mixing system that is shown in FIG. 3(*c*), the first console is the master;

FIG. 7 is a status change diagram for the first console (the master), the first processor, the second console (slave) and the second processor in the disconnection detection processing and the disconnection message reception processing in a case where, for the mixing system that is shown in FIG. 3(*c*), the first console is the master;

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Figure 1:
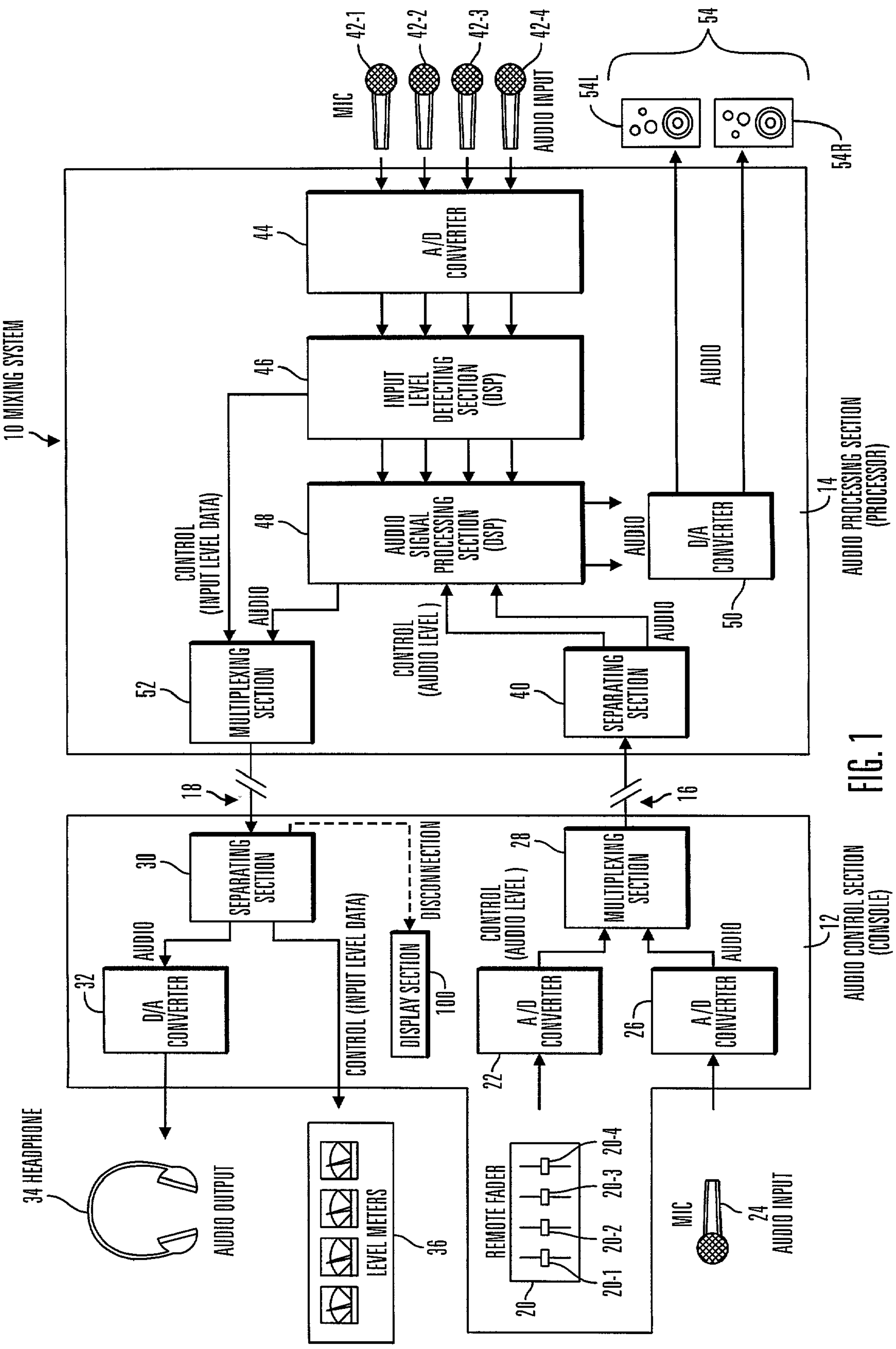
FIG. 1 is a block structural drawing that shows a mixing system in accordance with the present invention in terms of the hardware structure in which the mixing system is equipped with an audio control apparatus and an audio processing apparatus.

FIG. 1 shows a block structural drawing in which the audio control apparatus and the audio processing apparatus in the mixing system in accordance with the present invention have been depicted in terms of the hardware structure.

Incidentally, in FIG. 1, for clarity, the drawing concerns a mixing system in which one audio control apparatus and one audio processing apparatus are connected and the two are used in a one-to-one relationship.

In FIG. 1, the mixing system 10 comprises the audio control apparatus 12 that is controlled by the microcomputer, which is not shown in the drawing, and that controls the audio signal (hereinafter, referred to as the "console") and the audio processing apparatus 14 that mixing processes the audio signal based on the control by the console 12 and that is controlled by the microcomputer which is not shown in the drawing (hereinafter, referred to as the "processor"). The console 12 and the processor 14 are formed as separate units that are physically separated and it is possible to place the console 12 and the processor separated in different locations.

Specifically, the console 12 is, for example, placed in the rear of the performance venue and the processor 14 is placed in the vicinity of the stage which is in the front of the performance venue.

Incidentally, the input level detection section 46 (which will be discussed later) and the audio signal processing section 48 (which will be discussed later) in the processor 14 are achieved by means of digital signal processors (DSP).

Here, the console 12 and the processor 14 are connected electrically via the transmission path 16 with which the signals that have been output from the console 12 (the digital audio signal and the digital control signal which will be discussed later) are input to the processor 14 and the transmission path 18 with which the signals that have been output from the processor 14 (the digital audio signal and the digital control signal which will be discussed later) are input to the console 12.

In addition, the transmission path 16 and transmission path 18 each comprise a single cable. In this preferred embodiment, the XLR connector of AES-EBU is used with these cables.

In addition, the console 12 includes the remote fader 20 with which the analog audio level control signals that control the audio levels of the audio signals of each of the channels in conformance with the positions of the fader operators 20-1 through 20-4 which respectively correspond to each of the channels of the microphones 42-1 through 42-4 (in this preferred embodiment, it is set divided into four channels in conformance with the number of channels of the microphones 42-1 through 42-4) that have been placed on the stage, or the like, at the front of the performance venue and are the resources that will be discussed later are generated and output, the A/D converter 22 with which the analog audio level control signals that have been output from the remote fader 20 are converted into digital audio level control signals (control parameters) and output, the A/D converter 26 with which the analog audio signals that are input from such things as an external microphone (MIC) or a CD player (not shown in the drawing) are converted into digital audio signals and output, the multiplexing section 28 with which the digital audio level control signals, which are the digital control signals, that are output from the A/D converter 22 and the digital audio signals that are output from the A/D converter 26 are multiplexed and output through the transmission path 16 as the output means, the separating section 30 with which the digital control signals and the digital audio signals that are input through the transmission path 18 are separated after being input and output as the input means, the D/A converter 32 with which the digital audio signals that are separated by the separating section 30 and output are converted into analog audio signals and output and the display section 100 with which the messages regarding disconnection (which will be discussed later) and the messages regarding connection in the digital control signals are displayed as disconnection data.

Incidentally, such things as the microphone 24 and a CD player may be built into the audio control apparatus.

In addition, it is desirable that an operator be established such that the input to the A/D converter 26 of such analog audio signals as those from the microphone 24 or the CD player can be turned on and off by means of an operation by the user.

Incidentally, it is set up such that the analog audio signals that are output from the D/A converter 32 can be output to such things as an external headphone and monitored by the user.

In addition, it is set up such that the digital input level data signals in the digital control signals that are separated by the separating section 30 and output can be output to the external level meters 36, with which the input levels of the audio signals of each of the channels are displayed, and monitored by the user.

On the other hand, the processor 14 includes the separation section 40 with which the multiplexed digital control signals and the digital audio signals that are input through the transmission path 16 are separated after being input and output as the input means, the A/D converter 44 with which the analog signals that have been input via the route of the four channels for the external microphones (MIC) 42-1 through 42-4, which have been placed in such locations as on the stage of the performance venue as the resources, are converted into digital signals and output, the input level detection section 46, which consists of the DSP and with which, together with outputting the digital audio signals that are output from the A/D converter 44, detects the input level data for said digital audio signals and outputs them as the digital input level data signals, which are the digital control signals, the audio signal processing section 48, which consists of the DSP and with which mixing processing is carried out based on the audio level control signals as well as the digital audio signals from the digital control signals that are separated and output by the separating section 40 and the digital audio signals that are output from the input level detection section 46 and which outputs the digital audio signals, the D/A converter 50 with which the digital audio signals that are output from the audio signal processing section 48 are converted into analog audio signals and output and the multiplexing section 52 with which the digital input level data signals that have been output from the input level detection section 46 as the digital control signals and the digital audio signals that have been output from the audio signal processing section 48 are multiplexed and output through the transmission path 18 as the output means.

Incidentally, it is set up such that the analog audio signals that are output from the D/A converter 50 are output to the external speakers 54 (the speakers 54 comprise the speaker 54L for the left stereo channel and the speaker 54R for the right stereo channel) and these are emitted into space as musical tones that can be listened to.

Figure 2:
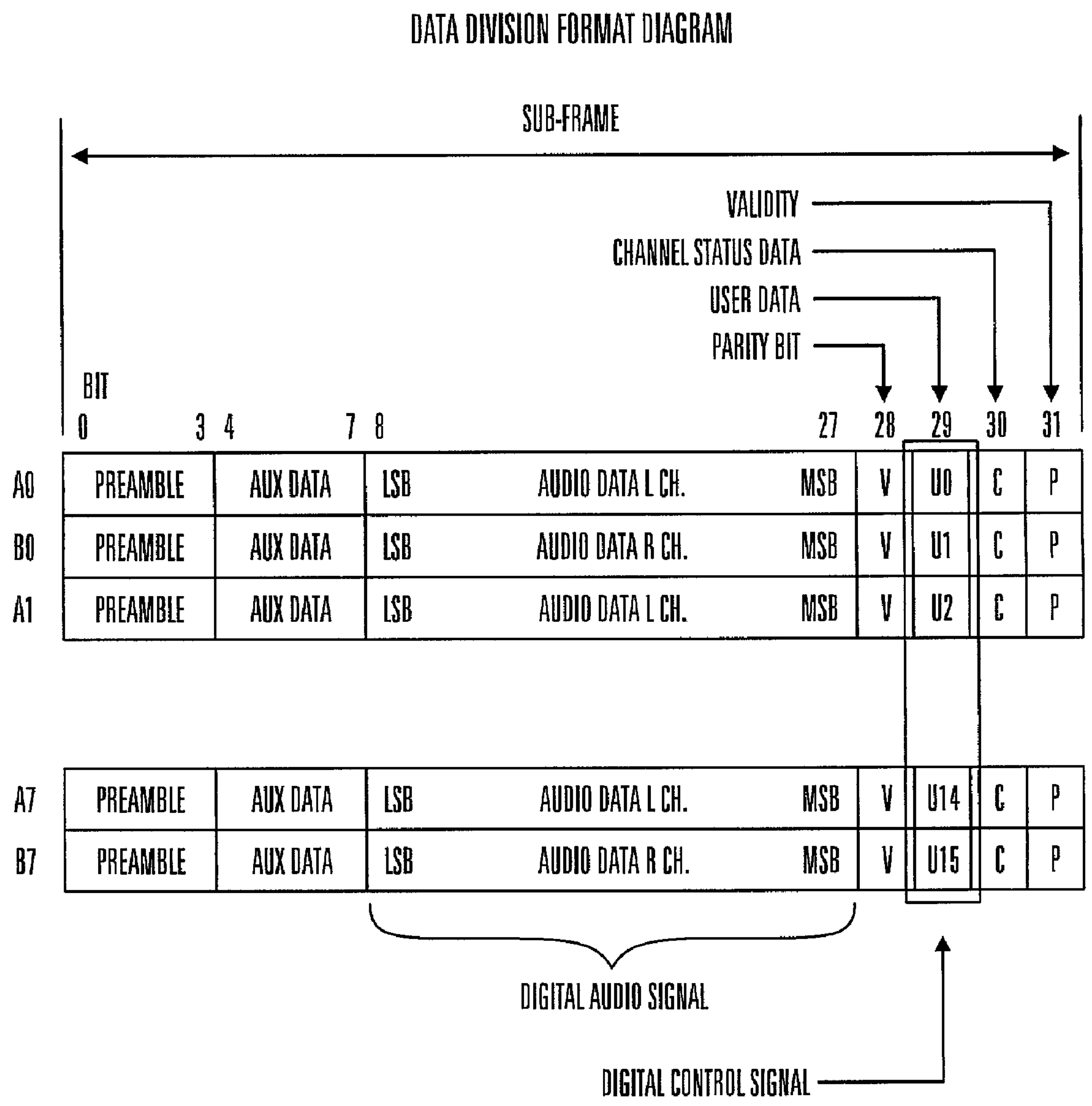
FIG. 2 is a drawing of the data division format in AES-EBU.

In FIG. 2, a data division format diagram for AES-EBU that is used in this preferred embodiment is shown. In the multiplexing section 28 of the console 12 and the multiplexing section 52 of the processor 14, the digital control signals and the digital audio signals are multiplexed by means of the formats shown in FIG. 2 and are respectively output to the transmission path 16 and the transmission path 18. That is to say, the same data formats are used in both directions in the bi-directional communications with the console 12 and the processor 14. As a result of this, it is possible to use the transmission path 16 and the transmission path 18 configured in an identical manner.

In FIG. 2, A0, B0, . . . indicate each of the subframes (incidentally, "A" indicates the left stereo channel (L. ch) and "B" indicates the right stereo channel (R. ch)) and each subframe is composed of 32 bits.

Among these 32 bits, bit 0 through bit 3 are the preamble, bit 4 through bit 7 are the auxiliary data, bit 8 through bit 27 are the audio data of the left channel or of the right channel that correspond to the digital audio signal, bit 28 is a parity bit, bit 29 is the user data, bit 30 is the channel status data and indicates the channel of the digital audio signal and bit 31 is the validity bit.

Here, in this preferred embodiment, the data for the amount of one cycle for the left channel or the right channel are transmitted for each subframe of the digital audio signal and the digital control signal is configured by the user data of bit 29 for the amount of 16 subframes.

Incidentally, one digital control signal comprises a plurality of words. Among these words, such things are included as words that indicate to what the digital control signal is related and words that indicate the level values.

For example, in the digital control signal that is output from the console 12 as an audio level control signal are included a word that indicates that the digital control signal controls the level of the audio signal of which channel number and a word that indicates how much to control the level of the audio signal of that channel.

In addition, in the digital control signal that is output from the processor 14 as input level data, are included a word that indicates that the digital control signal shows the level of the audio signal of which channel number and a word that indicates how much the level of the audio signal of that channel is controlled.

In other words, in this preferred embodiment, since, as described above, AES-EBU, which is an existing format, is utilized in the multiplexing section 28 of the console 12 and the multiplexing section 52 of the processor 14, it is possible to use existing cables that employ XLR connectors for the transmission path 16 and the transmission path 18.

In the console 12 in the above configuration, analog audio level control signals are produced that control the audio levels of each channel in accordance with the positions of the fader operators 20-1 through 20-4 that correspond to each channel of the remote fader 20 and these analog audio level control signals are output to the A/D converter 22.

Then, in the A/D converter 22, the analog audio level control signals that have been output by the remote fader 20 are input and said analog audio level control signals are converted to the digital audio level control signals, which are the digital control signals and output to the multiplexing section 28.

Incidentally, each of the remote fader 20 outputs by the A/D converter 22 is time divided and digitized. The multiplexing section 28 inspects the control levels that indicate the digital audio levels of each channel and, when there has been a change in the control level, the digital audio level control signals of the channels that have changed are output as digital control signals.

On the other hand, the analog audio signal that has been input from the microphone 24 is changed into a digital signal in the A/D converter 26 and output to the multiplexing section 28.

Incidentally, the digital audio signals that are output by the A/D converter 26 are made into the stereo signals of two channels that have been time division multiplexed and the audio signal that has been input by the microphone 24 is apportioned equally to the left channel and the right channel.

In the multiplexing section 28, the digital audio level control signals that are output by the A/D converter 22 as digital control signals and the digital audio signals that are output by the A/D converter 26 are input; further multiplexing of said digital control signals and said digital audio signals is carried out in accordance with the data division format of the AES-EBU shown in FIG. 2 and output to the transmission path 16 that is the single cable which uses an XLR connector.

Then, in the processor 14, the digital control signals and the digital audio signals that have been multiplexed are first input to the separating section 40 through the transmission path 16. In the separating section 40, said multiplexed digital control signals and digital audio signals are each separated into digital control signals and digital audio signals and output to the audio processing section 48.

On the other hand, with regard to the analog audio signals that have been input from the microphones 42-1 through 42-4, after they have been converted into digital audio signals by the A/D converter 44, their input level data are detected by the input level detection section 46 and then they are output to the audio processing section 48.

Here, in the audio processing section 48, together with the input of the digital audio level control signals for the four channels that are contained in the digital control signals that have been output by the separating section 40, the digital audio signals that have been output by the input level detection section 46 are input. Together with the control of the audio levels of said digital audio signals by the digital audio level control signals of the four channels that are contained in the digital control signals that have been output by the separating section 40, the digital audio signals that have been output by the separating section 40 are input, mixing processing is carried out with these digital audio signals and they are output to the D/A converter 50 and the multiplexing section 52 as the stereo digital signals for the left channel and the right channel.

Incidentally, with the audio processing section 48, when the digital audio level control signals from the console 12 are supplied, the control levels are stored and the mixing processing is carried out in accordance with these stored control levels. In the D/A converter 50, the stereo digital audio signals of the left channel and the right channel that have been input by the audio signal processing section 48 are input and said left channel and right channel stereo digital audio signals are converted into the left channel and the right channel stereo analog audio signals. The left channel analog audio signals are output to the speaker 54L for the left channel and, together with this, the right channel analog audio signals are output to the speaker 54R for the right channel.

By this means, the analog audio signals that have been input to the processor 14 from the microphones 42-1 through 42-4 are mixing processed in accordance with the audio levels that have been controlled by the remote fader 20 of the audio signal control section 12 and are emitted into space as musical tones that can be listened to from the speaker 54L for the left channel as well as the speaker 54R for the right channel which are connected to the processor 14.

In addition, by this means, the analog audio signals that have been input into the console 12 by the microphone 24 are emitted into space as musical tones that can be listened to from the speaker 54L for the left channel as well as the speaker 54R for the right channel which are connected to the processor 14.

Accordingly, in the mixing system 10 that has been described above, in the case where analog audio signals are not input to the console 12 from the microphone 24, the mixing processing is achieved in the same manner as with the prior art mixing system for which an explanation was given in the section "Background of the Invention."

On the other hand, in the mixing system 10 that has been described above, in the case where analog audio signals have been input to the console 12 from the microphone 24, the user, who is located in the place where the console 12, to which the microphone 24 has been connected, has been placed, for example, the rear of the performance venue, is able to provide various kinds of instructions from the speakers 54 to the performer who is on the stage in the front of the performance venue through the microphone 24.

In addition, it is set up such that in the case where a CD player has been connected instead of the microphone 24, it is possible to play background music in the performance venue.

By the way, the digital input level data signals which are the digital control signals that have been output by the input level detection section 46 and the digital audio signals that have been output by the audio signal processing section 48 are output to the multiplexing section 52.

In the multiplexing section 52, digital input level data signals that have been output by the input level detection section 46 and the digital audio signals that have been output by the audio signal processing section 48 are input. Further multiplexing of said digital input level data signals (in other words, the digital control signals) and said digital audio signals is carried out in accordance with the data division format AES-EBU that is shown in FIG. 2 and they are output to the transmission path 18 which is a single cable using an XLR connector prescribed for AES-EBU.

Incidentally, the input level detection section 46 detects the input levels for each of the four channels divided by time, the multiplexing section 52 inspects the input levels that are indicated by the digital input level data signals for each of the channels and, when there has been a change in the input level, the input level data signals for the channels that have changed are output as digital control signals.

Then, in the console 12, the digital input level data signals and the digital audio signals that have been multiplexed and input through the transmission path 18 are first input to the separating section 30. In the separating section 30, said digital input level data signals and digital audio signals that have been multiplexed are respectively separated into the digital input level data signals and the digital audio signals. The digital input level data signals are output to the external level meters 36 and the digital audio signals are output to the D/A converter 32.

Accordingly, the user is able to monitor the input levels of the audio signals of each channel by observing the external level meters 36 and without relying only on the audio that has been emitted in the performance venue.

In addition, in the D/A converter 32, the digital audio signals that have been separated and output by the separating section 20 are converted into analog audio signals and output to the headphones 34.

Because of this, in the mixing system 10 that has been described above, it is set up such that the user is able to directly monitor the state of the audio inputs of the microphones 42-1 through 42-4 by the performer who is on the stage at the front of the performance venue from the place where the console 12, to which the headphones 34 are connected, has been placed, for example, the rear of the performance venue.

Incidentally, with the console 12 and the processor 14, a clock signal is required that is the standard when each of the sections that handle the digital audio signals such as the A/D converters 22, 26 and 44, the D/A converters 32 and 50, the audio signal processing section DSP 48, the input level detection section 46, the multiplexing sections 28 and 52 and the separating sections 30 and 40 are operated.

In this preferred embodiment, for the clock signal that is the standard, there are cases where it is generated based on a clock signal that is produced by a crystal oscillator that is established inside the apparatus itself (built-in clock) and there are cases where it is generated based on a sub frame of the AES-EBU signal received.

In this preferred embodiment, it can be set up such that, no matter whether or not the AES-EBU signal has been received by either one of the units, the console 12 and the processor 14, that constitute one of the mixing systems, a standard clock signal is generated by the crystal oscillator that has been established in the apparatus itself (hereinafter, this apparatus will be referred to as the "master") or it can be set up such that the standard clock is generated based on an external clock or an apparatus other than the master (hereinafter, this apparatus will be referred to as the "slave"). This will be discussed in detail later.

In accordance with the explanation that has been given above, with the console 12 and the processor 14, the transmission (input and output) of the digital control signals and the digital audio signals are carried out by means of two wiring paths, the transmission path 16 and the transmission path 18, which are respectively connected for dedicated transmission in one direction (output) and, together with this, dedicated reception in the other direction (input).

Specifically, the transmission path 16 is used for dedicated transmission (output) and, together with this, the transmission path 18 is used for dedicated reception (input) with the console 12, while the transmission path 18 is used for dedicated transmission (output) and, together with this, the transmission path 16 is used for dedicated reception (input) with the processor 14.

In other words, The dedicated transmission path for reception (input) is connected on the upstream (input) side of the console 12 as well as the processor 14 and the dedicated transmission path for transmission (output) is connected on the downstream (output) side of the console 12 as well as the processor 14.

Here, as was described above, identical configurations are used for the transmission path 16 and the transmission path 18.

Accordingly, in constructing a mixing system that has a total of three or more consoles 12 and processors 14 including at least one each of the console 12 and the processor 14, the consoles 12 or the processors 14 that are placed upstream and the consoles 12 or the processors 14 that are placed downstream are connected by loops that are mutually different, which are the transmission paths 16 for the consoles 12 and the processors 14 (as has been described above, since the configurations of the transmission path 16 and the transmission path 18 are identical, the transmission path 16 is used for representative purposes), and together with this, it is set up such that, by means of the establishment of the capability for each of the digital control signals that has been supplied from the consoles 12 and processors 14 to the consoles 12 or processors 14 that are located upstream to be supplied to the consoles 12 or the processors 14 that are located downstream, it is possible to control any of the consoles 12 and the processors 14 from any of the consoles 12 or the processors 14 without establishing a special unit with which the transmission paths 16 are mixed or separated.

Incidentally, the fact that the consoles 12 and the processors 14 are connected here by loops means that the consoles 12 as well as the processors 14 that constitute the mixing system are respectively connected in an environment such that the transmission path 16 that is exclusively for transmission (output) is used for the transmission (output) of the signals (the digital control signals as well as the digital audio signals) to the downstream consoles 12 or processors 14 and the transmission path 16 that is exclusively for reception (input) is used for the reception (input) of the signals (the digital control signals as well as the digital audio signals) from the upstream consoles 12 or processors 14.

In this manner, since, in the mixing system in which the consoles 12 and the processors 14 have been connected in a loop via the transmission path 16, it is not necessary to establish a separate unit with which the transmission paths 16 are mixed or separated, it is possible to configure a mixing system in which a total of three or more consoles 12 and processors 14 including at least one each of console 12 and processor 14 are connected without causing the configuration to become complicated or the costs to become high.

Figure 3A:
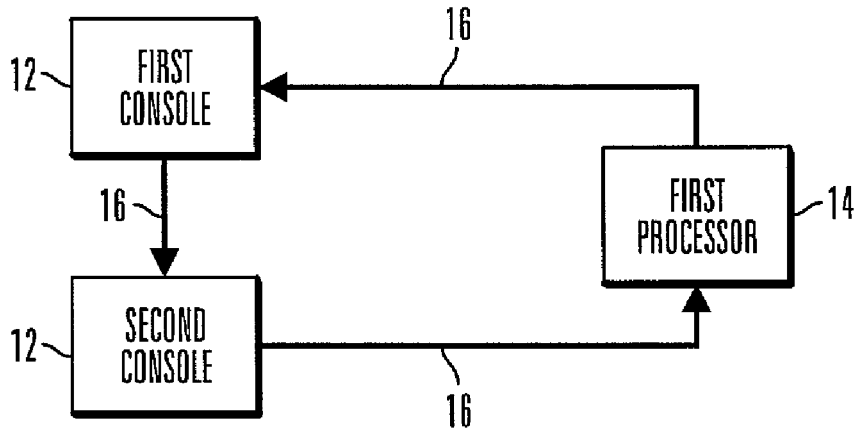
FIG. 3 is an explanatory drawing that shows examples of connection methods for the configuration of a mixing system in which a total of three or more consoles and processors including at least one each of console and processor are connected in a loop via a transmission path; (a) shows an example in which two consoles and one processor are connected in a loop via the transmission path; (b) shows an example in which one console and two processors are connected in a loop via the transmission path; and (c) shows an example in which two consoles and two processors are connected in a loop via the transmission path.
Figure 3B:
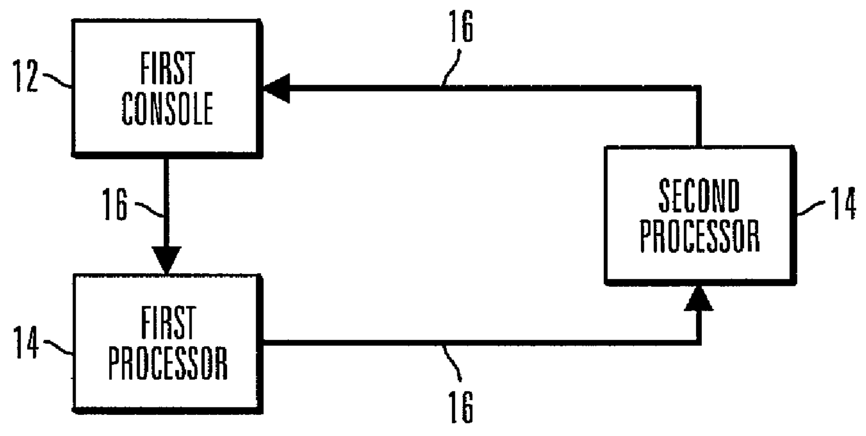
Figure 3C:
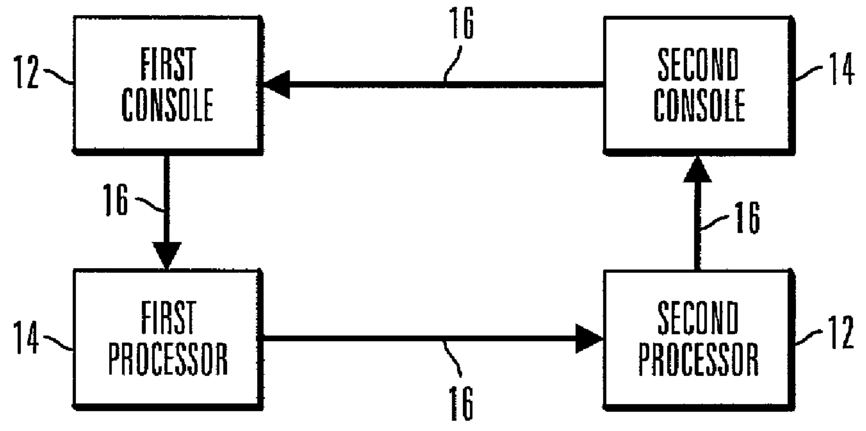

There is a connection method such as is shown here in, for example, FIGS. 3(*a*), (*b*) and (*c*) as a connection method for the configuration of a mixing system in which a total of three or more consoles 12 and processors 14 including at least one each of console 12 and processor 14 are connected in a loop via the transmission path 16.

In other words, in the connection method that is shown in FIG. 3(*a*), the first console 12 is connected to the second console 12, which is downstream from it, via the transmission path 16, the second console 12 is connected to the first processor 14, which is downstream from it, via the transmission path 16 and the first processor 14 is connected to the first console 12, which is downstream from it, via the transmission path 16. In this arrangement, two consoles 12 and one processor 14 are connected in a loop via the transmission path 16.

In this case, it is set up, for example, such that control of the processor can be carried out from two places at the same time, a console in the rear of the performance venue and a console in a wing of the stage.

In addition, in the connection method that is shown in FIG. 3(*b*), the first console 12 is connected to the first processor 14, which is downstream from it, via the transmission path 16, the first processor 14 is connected to the second processor 14, which is downstream from it, via the transmission path 16 and the second processor 14 is connected to the first console 12, which is downstream from it, via the transmission path 16. In this arrangement, one console 12 and two processors 14 are connected in a loop via the transmission path 16.

In this case, it is set up, for example, such that two processors are provided to increase the number of channels that can be processed and the two processors can be controlled by means of one console.

In addition, in the connection method that is shown in FIG. 3(*c*), the first console 12 is connected to the first processor 14, which is downstream from it, via the transmission path 16, the first processor 14 is connected to the second console 12, which is downstream from it, via the transmission path 16, the second console 12 is connected to the second processor 14, which is downstream from it, and the second processor 14 is connected to the first console 12, which is downstream from it, via the transmission path 16. In this arrangement, two consoles 12 and two processors 14 are connected in a loop via the transmission path 16.

As is shown in the illustrations of FIGS. 3(*a*), (*b*) and (*c*), it is set up such that, by means of a configuration of the mixing system in which a total of three or more consoles 12 and processors 14 including at least one each of console 12 and processor 14 are connected in a loop via the transmission path 16, it is possible to transmit (output) the digital signals (the digital control signals as well as the digital audio signals) from any console 12 or processor 14 that is upstream from any console 12 or processor 14 that is downstream via the transmission path 16.

In other words, in this mixing system, unit numbers (unit numbers are handled as digital control signals) are assigned in advance for each of the consoles 12 and the processors 14 that constitute the mixing system as identification data with which to identify each of them and, because of this, by transmitting a digital control signal to which a unit number has been attached via the transmission path 16, it is possible to control the console 12 or the processor 14 that corresponds to said number.

Incidentally, specific unit numbers are defined and these specific unit numbers are the subjects of control for all of the consoles 12 and the processors 14.

That is to say, in the consoles 12 or the processors 14 that are downstream on the transmission path 16, the unit number that is attached to the digital control signal that has been input by a console 12 or a processor 14 that is upstream on said transmission path 16 is detected, a comparison is made between the detected unit number and its own (that of the console 12 or the processor 14 to which the digital control signal has been input) unit number and, if it is a digital control signal in which the detected unit number and its own unit number match, it carries out its processing without outputting the signal to a console 12 or a processor 14 that is farther downstream.

On the other hand, when a comparison is made between the detected unit number and its own (that of the console 12 or the processor 14 to which the digital control signal has been input) unit number, if it is a digital control signal in which the detected unit number and its own unit number do not match, it outputs the signal unchanged to a console 12 or a processor 14 that is farther downstream than it is.

In addition, with regard to a digital control signal that has not been processed by any downstream console 12 or processor 14, it is set up such that it will not be output to the console 12 or the processor 14 that is the transmitter that has initially output said signal. Incidentally, in addition to the unit number of the transmission destination, the unit number of the transmitter is attached to the digital control signal.

The consoles 12 and the processors 14 into which the digital control signal has been input detect the unit number of the transmitter, a comparison is made between the detected unit number and its own (that of the console 12 or the processor 14 to which the digital control signal has been input) unit number and, if it is a digital control signal in which the detected unit number and its own unit number match, it does not output the digital control signal that has been input to a console 12 or a processor 14 that is farther downstream than it is.

Incidentally, even in those cases where a total of three or more consoles 12 and processors 14 including at least one each of console 12 and processor 14 are connected, the process is started in any one of the apparatuses and stopped in an apparatus other than that one.

Figure 4:
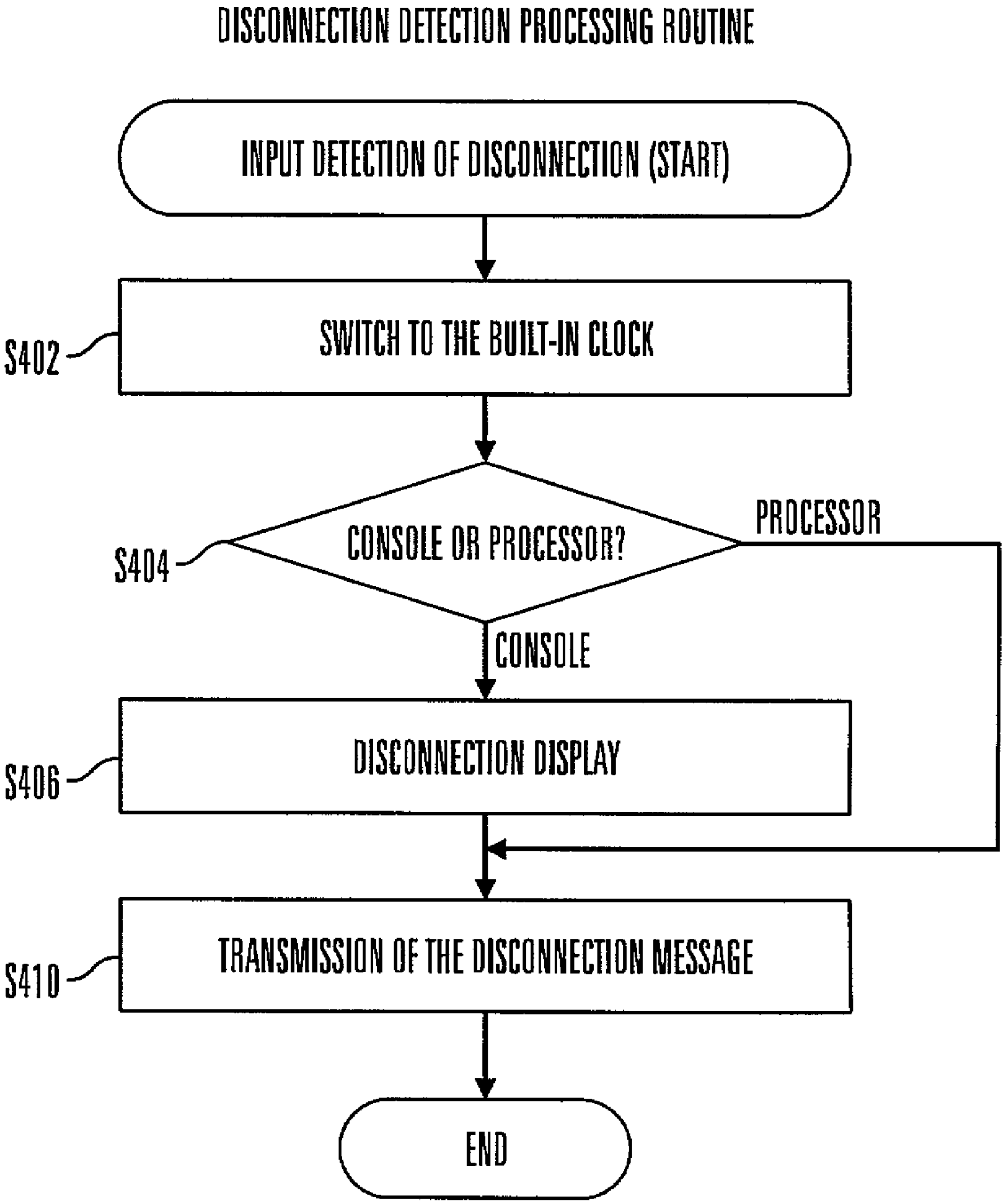
FIG. 4 is a flowchart of the disconnection detection processing routine.
Figure 5:
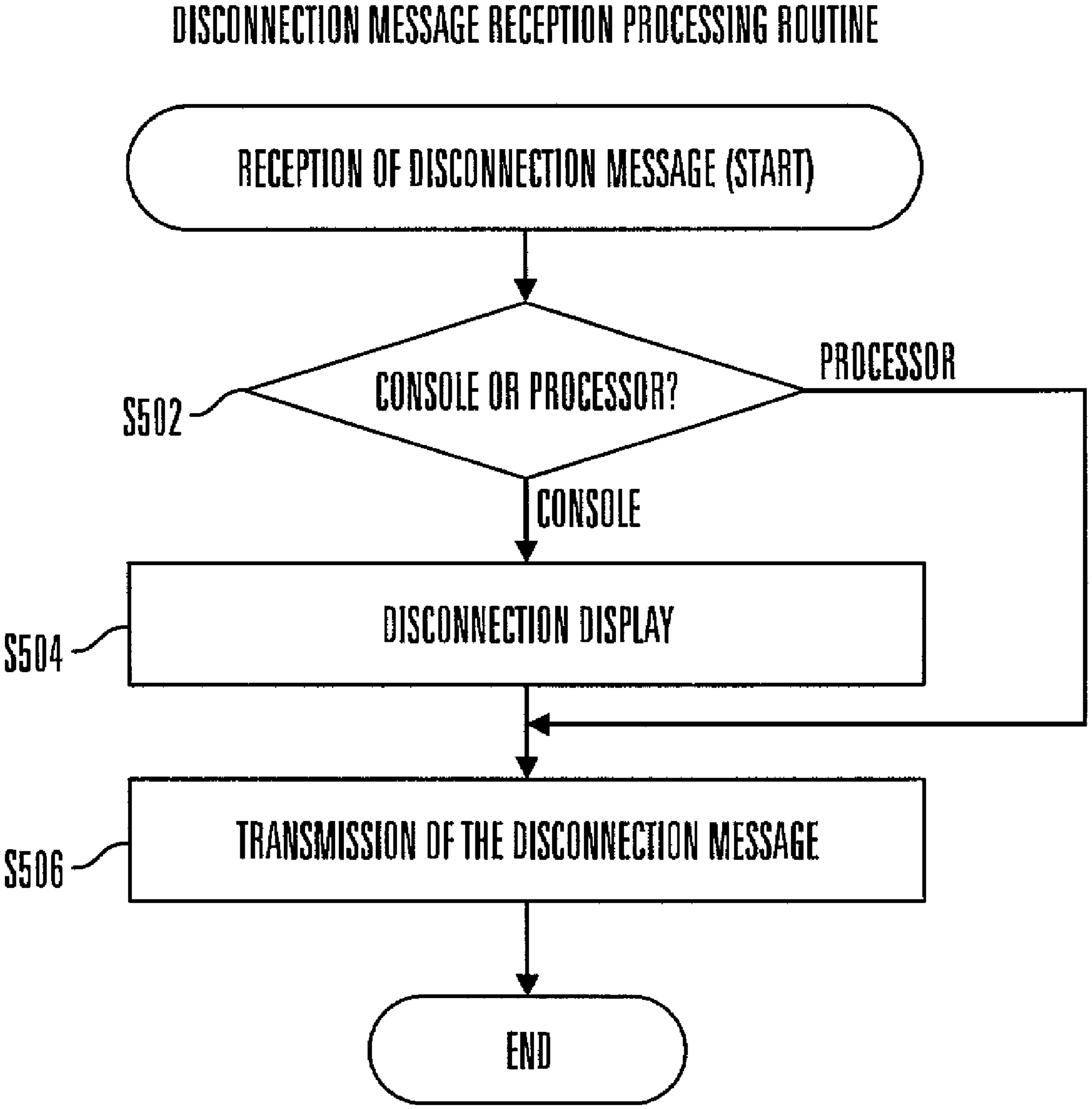
FIG. 5 is a flowchart of the disconnection message reception routine.

Here, in a case where, in the mixing system that is shown in the FIG. 1 and FIGS. 3(*a*), (*b*) and (*c*), there has been a disconnection of the transmission path 16 (as has been discussed above, since the transmission path 16 and the transmission path 18 are configured identically, the transmission path 16 is used to represent both; with regard to "transmission path 16," in FIG. 1 also, this is meant to include "transmission path 18"), the disconnection detection processing routine that is shown in the flowchart of FIG. 4 is executed as the process that accompanies the disconnection of the transmission path 16 and, together with the carrying out of the disconnection detection processing, the disconnection message reception processing routine that is shown in the flowchart of FIG. 5 is executed, and the disconnection message processing is carried out.

Incidentally, both the consoles 12 and the processors 14 operate based on dedicated programs of the microcomputer that is not shown in the drawings and it will be explained that common routines are used in said disconnection detection processing routine and said disconnection message reception processing routine. Of course, it may be set up such that the consoles 12 and the processors 14 each use dedicated routines.

First, an explanation will be given regarding the disconnection detection processing with reference to the flowchart of the disconnection detection processing routine that is shown in FIG. 4.

This disconnection detection processing routine is a routine that is executed when the transmission path 16 that is used exclusively for reception (input) has been disconnected in the console 12 or the processor 14 with said transmission path 16.

In other words, in this mixing system, the external clock (subframe) is input to the console 12 or the processor 14 via the dedicated transmission path 16 for reception (input) and, if said dedicated transmission path 16 for reception (input) should become disconnected, the input of the external clock will not be input. A clock detection circuit in the console 12 or the processor 14 detects the fact that the dedicated transmission path 16 for reception (input) has been disconnected by detecting that the external clock is no longer being input from the dedicated transmission path 16 for reception (input) and the disconnection detection processing routine that is shown in FIG. 4 is started and executed in the console 12 or the processor 14 with which said dedicated transmission path 16 for reception (input) is used.

That is to say, when the disconnection detection processing routine is started by the detection of the disconnection of the input, first, the clock signal, which is the standard for operation, ceases to be generated by the external clock from the dedicated transmission path 16 for reception (input) and is switched such that it is generated by the built-in clock (Step S402).

Incidentally, the details of the processing that is shown in FIG. 4 relate to a slave apparatus and, in the case of a master apparatus, only the processing excluding this Step S402 of the processing contents that are shown in FIG. 4 is carried out.

When the processing of the Step S402 has finished, it proceeds to the processing of Step S404 and a determination is made regarding the unit that has detected the disconnection of the dedicated transmission path 16 for reception (input), in other words, whether the unit itself is a console 12 or a processor 14.

In the Step S404, in the case where a determination has been made that the unit that has detected the disconnection of the dedicated transmission path for reception (input), that is to say, the thing itself, is a console 12, a display is made in the display section 100 to the effect that there has been a disconnection, for example, a display regarding the disconnection such as, "disconnection produced," is carried out (Step S406), advising the user of the fact that the transmission path 16 has been disconnected.

When the processing of this Step S406 has finished, it proceeds to Step S410 and a disconnection message indicating that the transmission path 16 has been disconnected is transmitted as a digital control signal by a message generation circuit via the dedicated transmission path 16 for transmission (output) to the downstream consoles 12 or processors 14.

At this time, special unit numbers are used for all of the consoles 12 and processors 14 that are the objects of control as the unit numbers for the transmission destinations that are attached to the disconnection message.

Then, when the processing of Step S410 has finished, this disconnection detection processing routine terminates.

On the other hand, in the Step S404, in the case where it has been determined that the unit that has detected the fact that the dedicated transmission path 16 for reception (input) has been disconnected is a processor 14, it proceeds to the Step S410 and a disconnection message indicating that the transmission path 16 has been disconnected is transmitted as a digital control signal by a message generation circuit via the dedicated transmission path 16 for transmission (output) to the downstream consoles 12 or processors 14 providing notification of the disconnection.

Then, when the processing of Step S410 is finished, this disconnection detection processing routine terminates.

Incidentally, in the case where the dedicated transmission path 16 for reception (input) is disconnected and the external clock ceases to be input, a digital signal is output that the levels of the separation section 30 and the separation section 40 are "0."

In addition, in the consoles 12 or the processors 14 by which, as described above, the disconnection message has been received by a message receiving circuit via the dedicated transmission path 16 for reception (input), the disconnection message reception processing routine (FIG. 5) is launched by the reception of the disconnection message and executed.

Incidentally, in the case where the unit number from the transmitter that is attached to the disconnection message that has been received matches the unit number of that unit, the processing routine for the disconnection message reception is launched.

When this disconnection message reception routine is launched, first, a determination is made as to whether the unit that has received the disconnection message is a console 12 or a processor 14 (Step S502).

In the case where, in the Step S502, it has been determined that the unit that has received the disconnection message is a console 12, a display is made in the display section 100 to the effect that there has been a disconnection, for example, a display regarding the disconnection such as, "disconnection produced," is carried out (Step S504), advising the user of the fact that the transmission path 16 has been disconnected.

When the processing of this Step S504 has finished, it proceeds to Step S506 and a disconnection message indicating that the transmission path 16 has been disconnected is transmitted as a digital control signal via the dedicated transmission path 16 for transmission (output) to the downstream consoles 12 or processors 14.

Then, when the processing of Step S506 has finished, this disconnection detection processing routine terminates.

On the other hand, in the Step S502, in the case where it has been determined that the unit that has received the disconnection is a processor 14, it proceeds to Step S506 and a disconnection message indicating that the transmission path 16 has been disconnected is transmitted as a digital control signal via the dedicated transmission path 16 for transmission (output) to the downstream consoles 12 or processors 14 providing notification of the disconnection.

Then, when the processing of Step S506 is finished, this disconnection detection processing routine terminates.

Accordingly, by means of execution of the disconnection detection processing and the disconnection message reception processing that accompany the disconnection of the transmission path 16, a disconnection message that indicates that the transmission path 16 has been disconnected is transmitted to all of the consoles 12 and processors 14 that are connected in a loop via the transmission path 16 and notification of the disconnection is made.

Then, as the processing in response to the reception of the disconnection message, a display to the effect that the transmission path 16 has been disconnected is made in the display section 100 of the console 12 and the message is again transmitted to the consoles 12 or the processors 14 that are downstream.

In addition, the processor 14 transmits the disconnection message to the consoles 12 or the processors 14 that are downstream as the processing in response to the reception of the disconnection message.

In FIG. 6 and FIG. 7, in the case in which the first console 12 for the mixing system that is shown in FIG. 3(*c*) is the master, for the case where the first console 12 (the master) has detected the disconnection, the case where the first processor 14 (a slave) has detected the disconnection, the case where the second console 12 (a slave) has detected the disconnection and the case where the second processor 14 (a slave) has detected the disconnection, status change diagrams in the disconnection detection processing as well as the disconnection message reception processing are shown for the first console 12 (the master), the first processor 14 (a slave), the second console 12 (a slave) and the second processor 14 (a slave), respectively.

As can be understood from the status change diagrams shown in FIG. 6 and FIG. 7, no matter at what connection location on the transmission path 16 there has been a disconnection, all of the consoles 12 as well as the processors 14 that constitute the mixing system are advised of the occurrence of the disconnection. In addition, processing in response to the disconnection point on the transmission path 16 is carried out in each of the consoles 12 as well as the processors 14.

As described above, the disconnection detection processing and the disconnection message reception processing are executed in the case where the transmission path 16 has been disconnected. However, in the case where said transmission path 16 has been reconnected after it has been disconnected, the connection detection processing routine that is shown in the flowchart of FIG. 8 is executed as the processing that accompanies the connection of the transmission path 16 and the connection detection processing is carried out.

Incidentally, the consoles 12 and the processors 14 are each operated based on dedicated programs of a microcomputer that is not shown in the drawing and an explanation is given regarding said connection detection processing routine in which a common routine is used. Of course, dedicated routines may be used for each of the consoles 12 and the processors 14.

Figure 8:
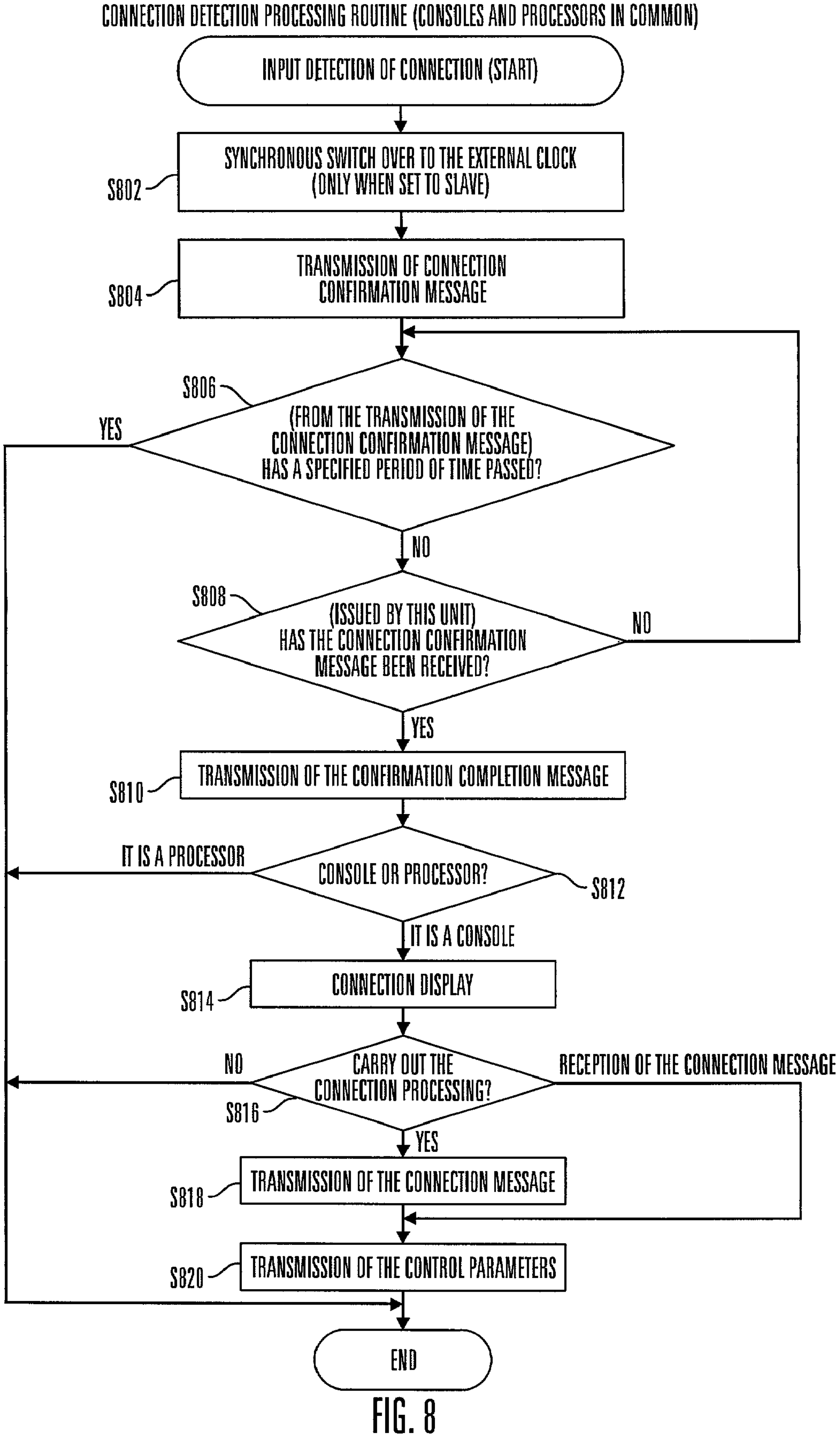
FIG. 8 is a flowchart of the connection detection processing routine.
Figure 9B:
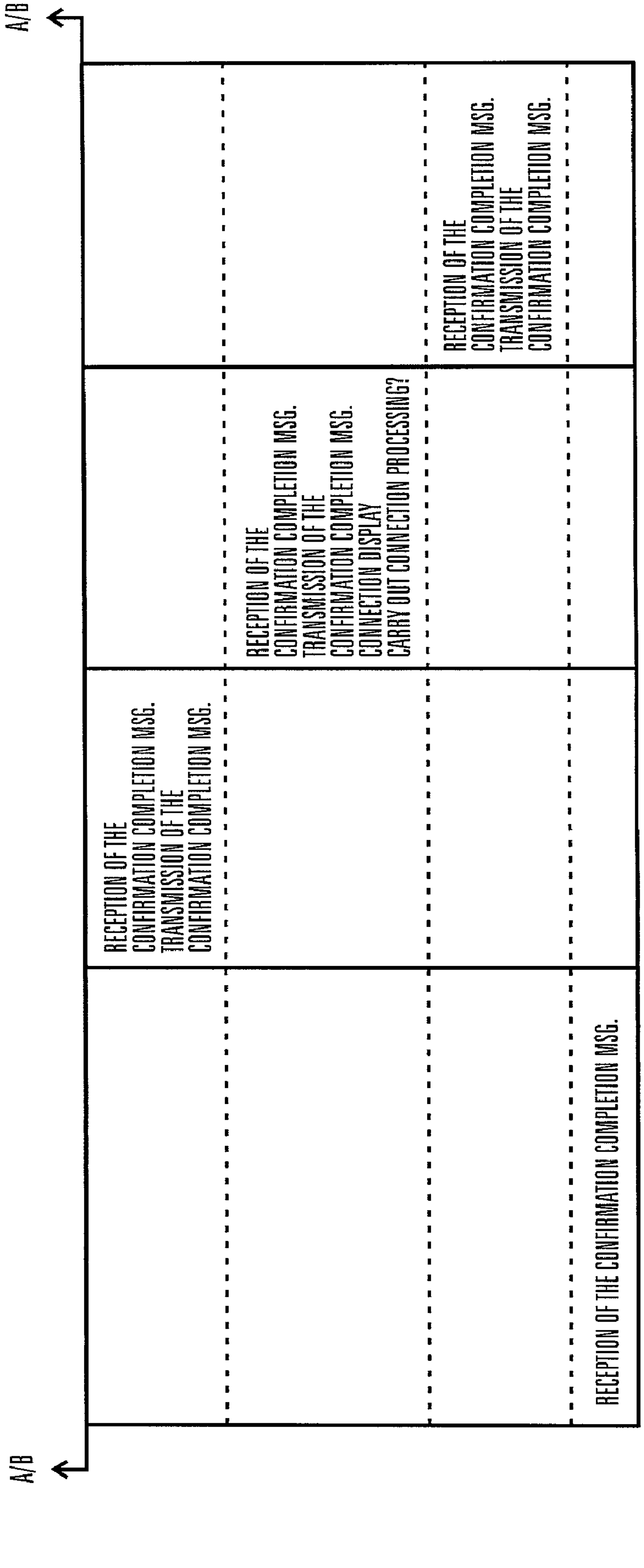
FIG. 9 is a status change diagram for the first console (the master), the first processor, the second console (slave) and the second processor in the connection detection processing and the connection message reception processing in a case where, for the mixing system that is shown in FIG. 3(*c*), the first console is the master.
Figure 10B:
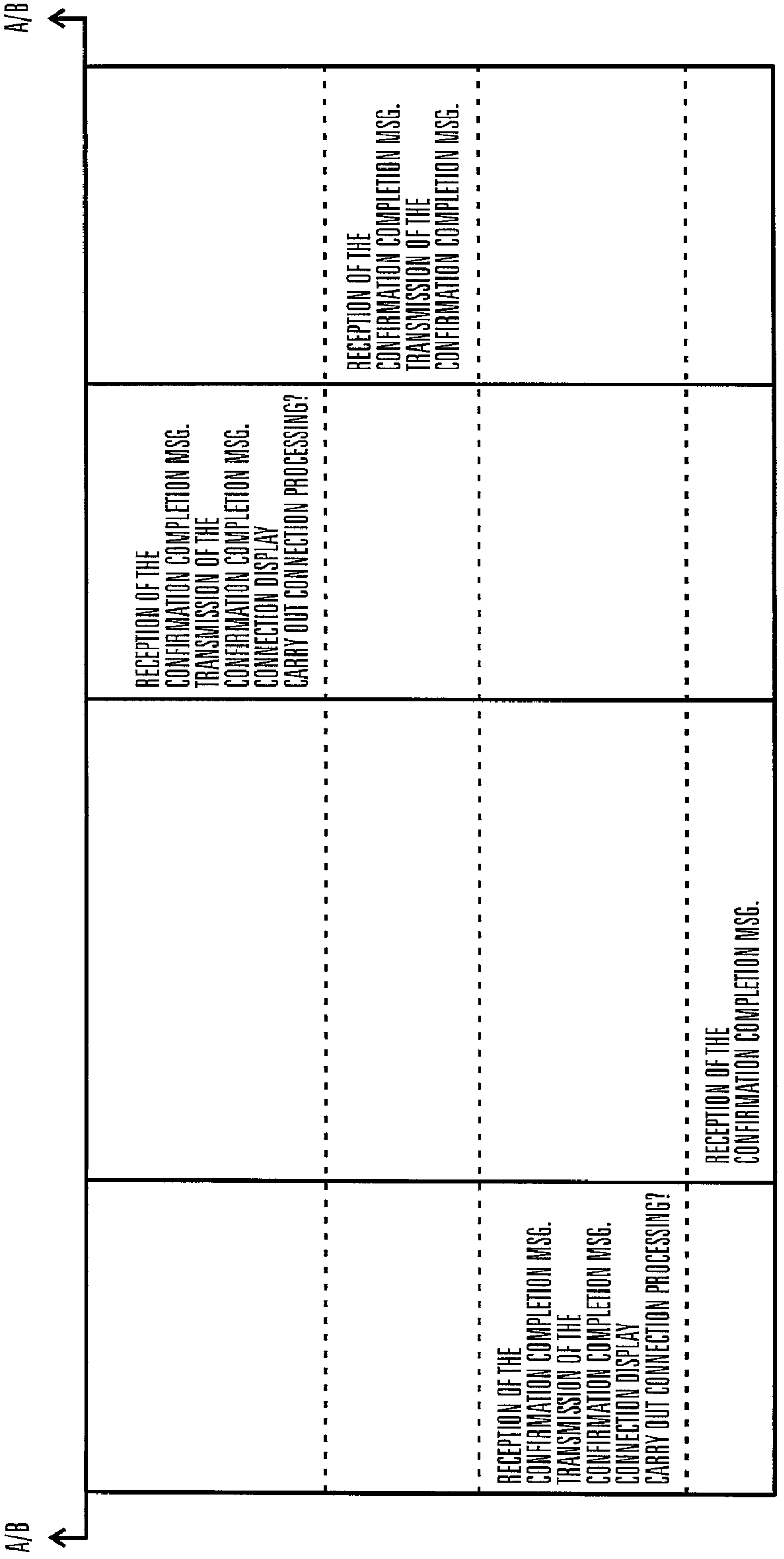
FIG. 10 is a status change diagram for the first console (the master), the first processor, the second console (slave) and the second processor in the connection detection processing and the connection message reception processing in a case where, for the mixing system that is shown in FIG. 3(*c*), the first console is the master.
Figure 11B:
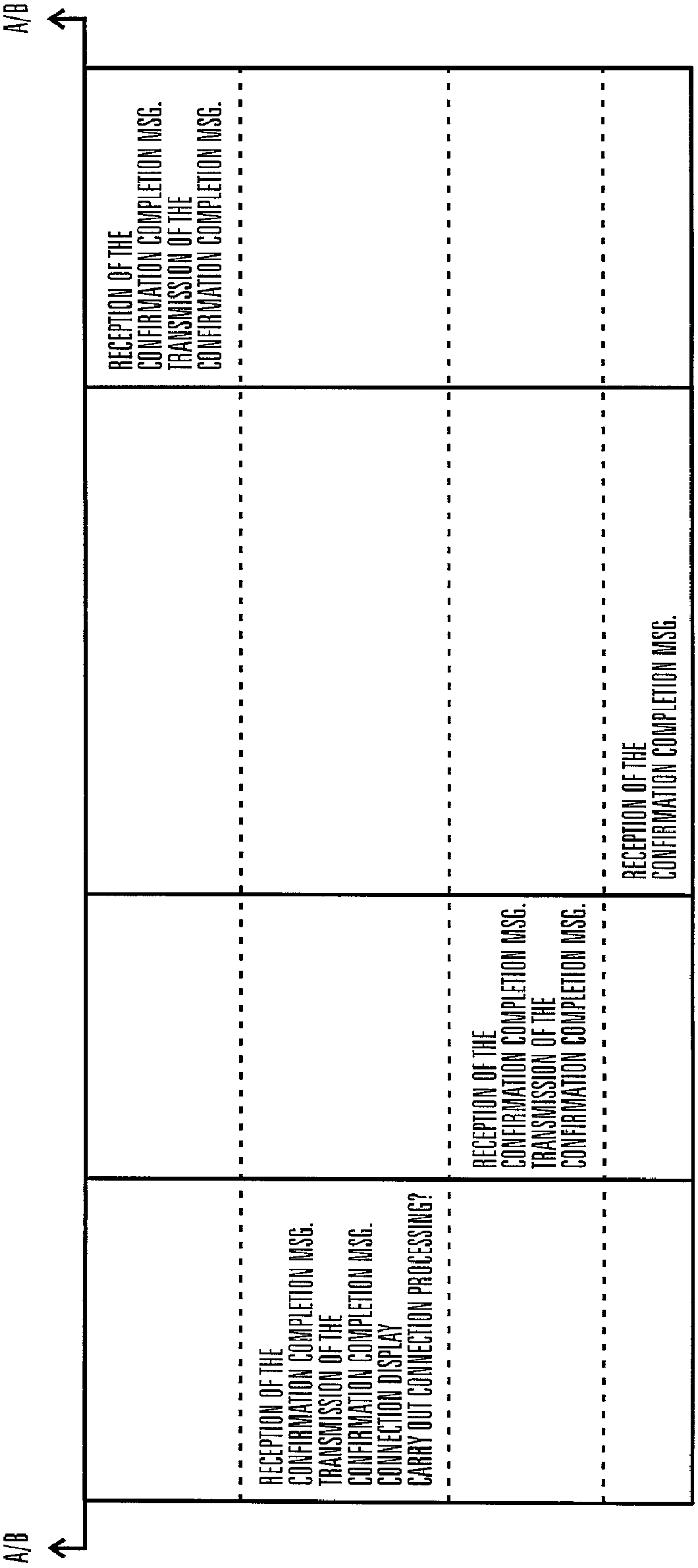
FIG. 11 is a status change diagram for the first console (the master), the first processor, the second console (slave) and the second processor in the connection detection processing and the connection message reception processing in a case where, for the mixing system that is shown in FIG. 3(*c*), the first console is the master.
Figure 12B:
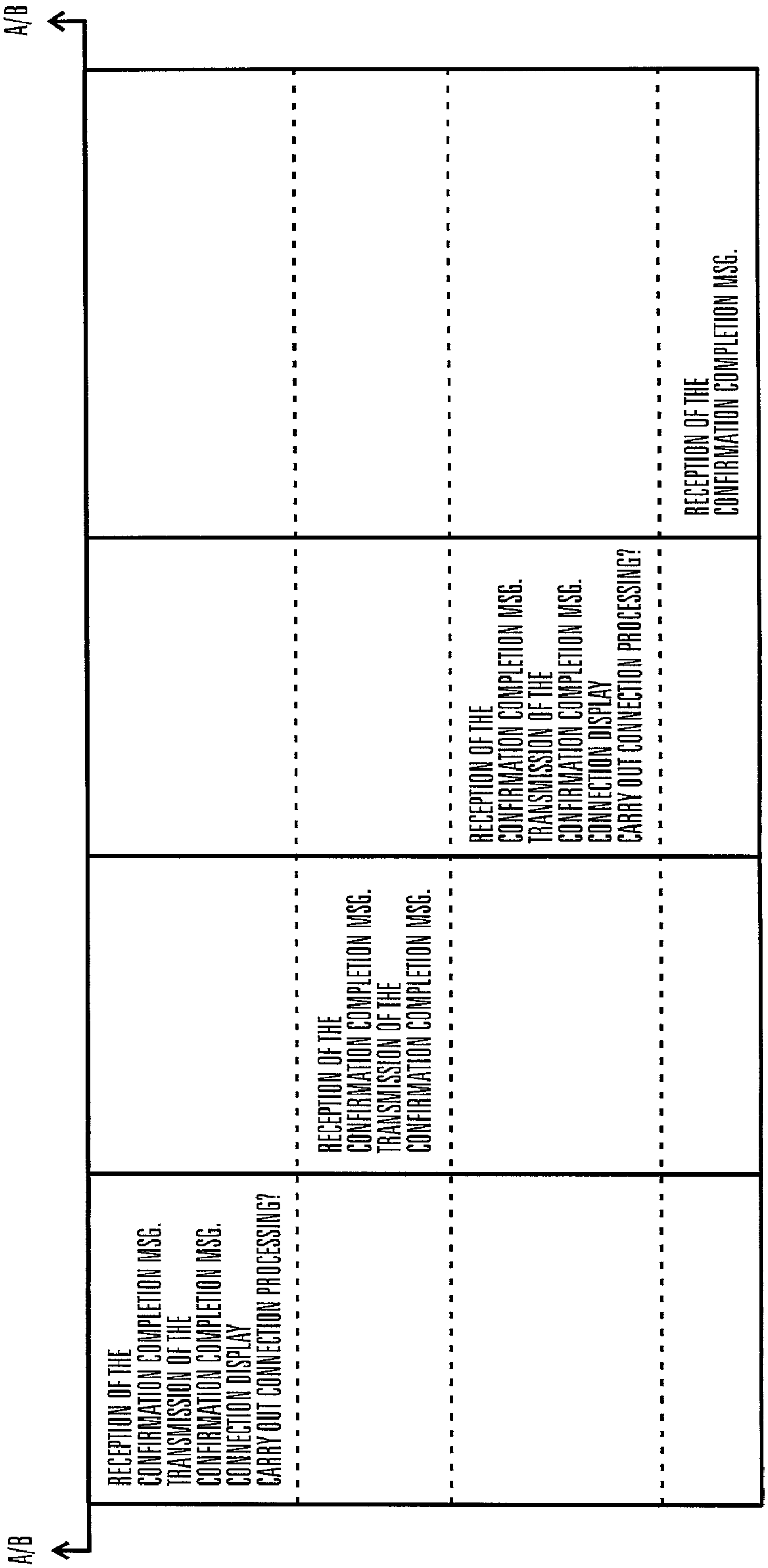
FIG. 12 is a status change diagram for the first console (the master), the first processor, the second console (slave) and the second processor in the connection detection processing and the connection message reception processing in a case where, for the mixing system that is shown in FIG. 3(*c*), the first console is the master.
Figure 13B:
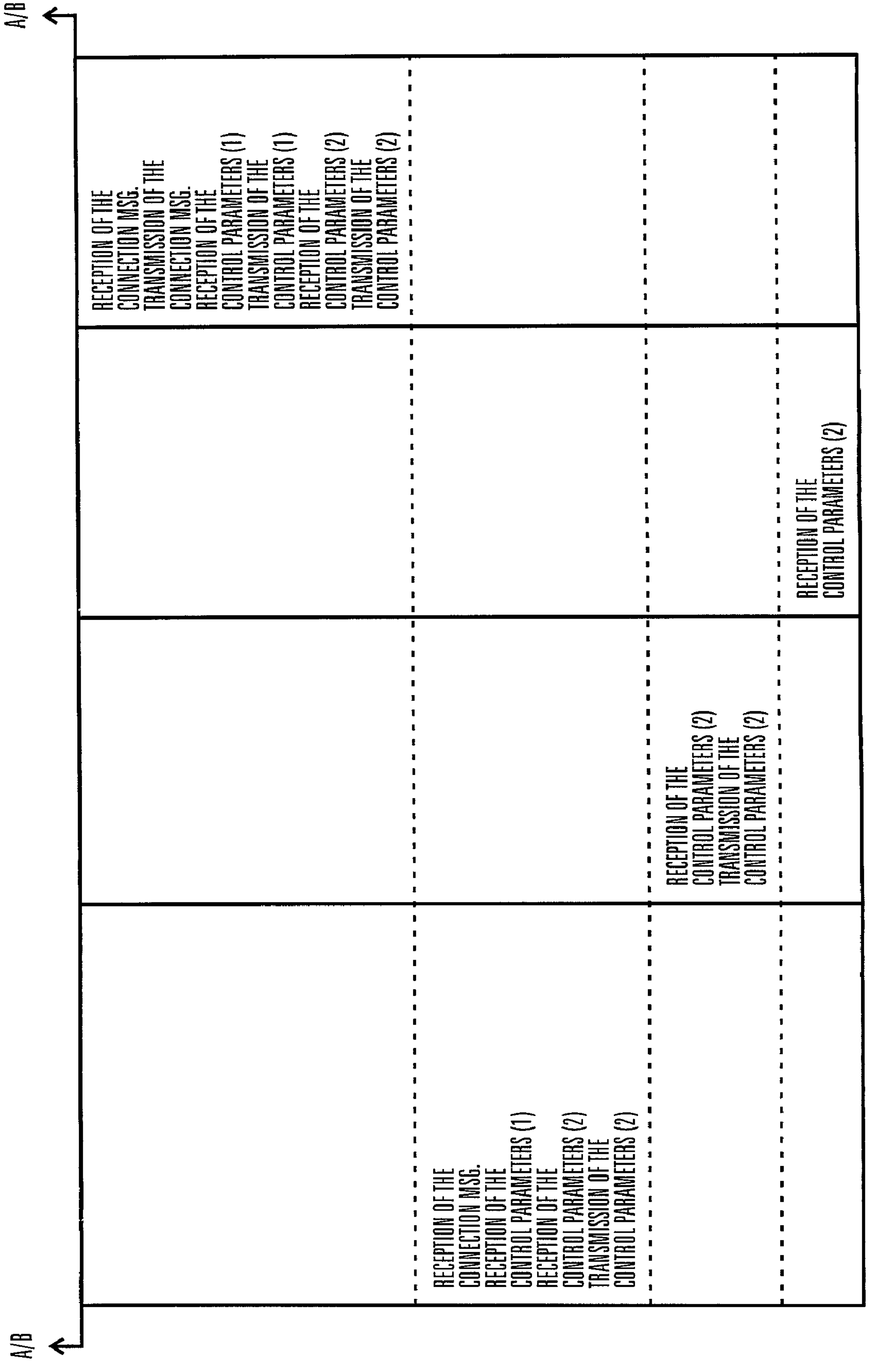
FIG. 13 is a status change diagram in a case where the user has selected processing in response to the connection in the first console 12 (the master).

An explanation will be given regarding the connection detection processing with reference to the flowchart of the connection detection processing routine that is shown in FIG. 8.

This connection detection processing routine is a routine that is executed when the transmission path 16 is connected such that the external clock can be input with the console 12 or the processor 14 that is used with said transmission path 16 that is used exclusively for reception (input) that has been connected.

As described above, in this mixing system, the external clock is input to the console 12 or the processor 14 via the dedicated transmission path 16 for reception (input) and, in the console 12 or the processor 14 in which the external clock has been input, synchronous switching from the built-in clock to the external clock occurs and the processing is carried out.

Accordingly, when the transmission path has been connected, the input of the external clock to the console 12 or the processor 14 with which the transmission path 16 is used exclusively for reception (input) is begun and the fact that the dedicated transmission path 16 for reception (input) has been connected is detected by the console 12 or the processor 14 by means of the detection of the starting of the input of the external clock. The connection detection processing routine that is shown in FIG. 8 is launched and executed in the console 12 or the processor 14 with which said transmission path 16 that has been connected is used exclusively for reception (input).

That is to say, when the connection detection processing routine is launched due to the detection of the connection of the input, synchronous switching to the external clock is carried out (Step S802).

Actually, the processing for the synchronous switching in Step S802 to the external clock by the console 12 or the processor 14 with which the transmission path 16 that has been connected is used exclusively for reception (input) is carried out only in the case where they are set as slaves.

When the processing of the Step S802 is finished, it proceeds to the processing of Step S804 and the console 12 or the processor 14 with which the transmission path 16 that has been connected is used exclusively for reception (input) transmits a digital control signal as a connection confirmation message that has its own unit number attached as the transmission destination.

On the other hand, the consoles 12 or processors 14 other than the console 12 or the processor 14 with which the transmission path 16 that has been connected is used exclusively for reception (input) receive the connection confirmation message from the dedicated transmission path for reception (input) by means of a flowchart not shown in the drawing and transmit it unchanged to the dedicated transmission path for transmission (output).

When the processing of this Step S804 finishes, it proceeds to the processing of Step S806.

In Step S806, a determination is made as to whether or not a specified period of time (for example, 5 minutes) has passed from the transmission of the connection confirmation message in Step S804.

In the case where, in Step S806, a determination has been made that a specified period of time has not passed from the transmission of the connection confirmation message in Step S804, a determination is made as to whether or not the connection confirmation message has been received (Step S808).

In addition, in the case where, in Step S806, a determination has been made that a specified period of time has passed from the transmission of the connection confirmation message in Step S804, it means that the dedicated transmission path 16 for reception (input) with which the connection detection processing routine has been launched has been connected but the consoles 12 and the processors 14 are not connected in a loop and the connection detection processing routine is terminated.

Then, in the case where, in Step S808, it has been determined that the connection confirmation message has been received, it proceeds to Step S810. In other words, in the case where the console 12 or the processor 14 has received the connection confirmation message that it itself has transmitted, it means that the console 12 as well as the processor 14 have detected the fact that a loop connection has been made by the connection of the dedicated transmission path 16 for reception (input) with which the connection detection processing routine has been launched.

On the other hand, in the case where, in Step S808, it has not been determined that the connection confirmation message has been received, it returns to Step S806 and the processing is repeated.

When the processing of Step S808 has finished, it proceeds to Step S810 and a confirmation completion message to provide notification of the loop connection is transmitted to the other consoles. By this means, it becomes possible to carry this out in other apparatuses and not only in the apparatus that has detected the "connection display" or the "user's confirmation (should the connection processing be carried out?)."When the processing of Step S810 has finished, it proceeds to Step S812 and makes a determination as to whether the item that has detected the connection of the dedicated transmission path 16 for reception (input), in other words, the unit itself, is a console 12 or a processor 14.

In the case where, in the Step S812, a determination has been made that the item that has detected the connection of the dedicated transmission path 16 for reception (input), in other words, the unit itself, is a console 12, it proceeds to Step S814, a display to the effect that a connection has been made, for example, a connection display such as "loop connection completed," is carried out in the display section 100, and the user is notified of the fact that the transmission path 16 that had been disconnected has been connected again.

On the other hand, in the case where, in the Step S812, a determination has been made that the item that has detected the connection of the dedicated transmission path 16 for reception (input), in other words, the unit itself, is a processor 14, the connection detection processing routine is terminated.

When the processing of Step S814 has finished, it proceeds to Step S816, queries whether or not the control parameters have been transmitted by the user by means of the display device and remains in a state of waiting for input from the operators that are not shown in the drawing and waiting for the reception of the connection message.

In the case where, in Step S816, the user has carried out the operation with which the control parameters are transmitted, it proceeds to Step S818 and a message that signifies that the transmission path 16 has been connected is transmitted as a digital control signal via the dedicated transmission path 16 for transmission (output) to the consoles 12 or the processors 14 that are downstream.

Then, when the processing of Step S818 has finished, it proceeds to the processing of Step S820 and the control parameters with which the direction of the control of the processors 14 is carried out are transmitted downstream as a digital control signal via the dedicated transmission path 16 for transmission (output).

Here, the values of the control parameters are in conformance with the current state of each of the operators of the remote fader 20.

On the other hand, in the case where, in the Step S816, the user has carried out an operation to not transmit the control parameters, the connection detection processing routine terminates.

In addition, in the case where in the Step S816, the confirmation message has been transmitted, in other words, in the case where the user has carried out a confirmation operation with another console, it proceeds to Step S820 and the control parameters with which the control of the processor 14 is directed are transmitted downstream as a digital control signal via the dedicated transmission path 16 for transmission (output).

Here, the values of the control parameters are in conformance with the current state of each of the operators of the remote fader 20.

Then, when the processing of Step S820 has finished, the connection detection processing routine is terminated.

Incidentally, in the processing of the console that has transmitted the confirmation completion message, the confirmation completion message that has been transmitted from upstream in the same manner as the other digital control signals is transmitted downstream and, together with this, the processing is carried out in conformance with each of the steps from Step S814 and on.

In addition, in the state of waiting for the input where a query is made as to whether or not the user has transmitted the control parameters from the display device 100, even in a case where the connection message that is transmitted from another console is transmitted, further processing is not carried out.

Accordingly, in this mixing system, by means of the execution of the connection detection processing that accompanies the connection of the transmission path 16, the user is notified of the fact that the transmission path 16 has been reconnected in a loop and, together with this, the control parameters for the setting of the processors 14 are transmitted from the console 12 to all of the processors 14 that are connected in a loop via the transmission path 16.

In FIG. 9 through FIG. 13, for the case in which the first console 12 for the mixing system that is shown in FIG. 3(*c*), status change diagrams are shown for the first console 12 (master), the first processor 14 (a slave), the second console 12 (a slave) and the second processor 14 (a slave) in the connection detection processing as well as the connection message reception processing.

As can be understood from the status change diagrams that are shown in FIG. 9 through FIG. 13, no matter in what location on the transmission path 16 the connection has been made, all of the consoles 12 as well as the processors 14 that constitute the mixing system are provided notification of the production of the connection. In addition, the control parameters for the setting of the processors 14 are transmitted by the console 12 to the processors 14.

Incidentally, for the connection method to connect the consoles 12 and processors 14 in the above-mentioned preferred embodiment in order to construct the mixing system, for example, a connection method such as the one shown in FIG. 1 and FIGS. 3(*a*), (*b*) and (*c*) has been presented. However, this connection method does not go beyond simply being an illustration and even in a case where any number of consoles 12 and processors 14 are used which are connected such that they become a loop in any order desired and the mixing system is configured, in the case where, in the same manner as described above, the transmission path that was disconnected has been connected, no matter at what location on the transmission path 16 the connection is made, notification is made to all of the consoles 12 and the processors 14 that constitute the mixing system that the connection has occurred and, of course, the processing is carried out in each of the consoles 12 and the processors 14 in conformance with the connection location on the transmission path 16.

In addition, in the case where the loop connection has been confirmed, it has been set up such that only "loop connection completed" or "carry out the connection processing?" is displayed in the display section 100 of the console 12, however, this is not limited to these.

For example, it may be set up such that the transmission path that has been reconnected is the transmission path for transmission (dedicated) of whichever apparatus is displayed based on the unit number of the transmitter that has been attached to the connection completion message. In addition, it may be set up such that this display is carried out in a processor 14.

In addition, in this preferred embodiment, it has been set up such that in the case where the completion of the loop connection has been detected by a console or a processor, confirmation by the user is demanded and the connection message and the control parameters are transmitted following the confirmation of the user, however, this is not limited to this.

For example, it may be set up such that the connection message and the control parameters are transmitted automatically without demanding confirmation by the user.

In addition, it may also be set up such that the user is able to select whether or not the connection message and the control parameters will be transmitted automatically.

In addition, it may also be set up such that the method of transmission is made to be different depending on whether the unit that detects the completion of the loop connection is a console or a processor. For example, it may be set up such that in the case where the unit that has detected the completion of the loop connection is a console, the connection message and the control parameters are transmitted following the confirmation by the user and, in the case where the unit that has detected the completion of the loop connection is a processor, the connection message and the control parameters are transmitted automatically without demanding confirmation by the user.

In addition, in the above-mentioned preferred embodiment, it has been set up such that the console 12 or the processor 14 that has detected the connection of the dedicated transmission path for reception (input) transmits the confirmation message after confirming that the loop connection has been completed, however, this is not limited to this.

For example, it may be set up such that in the case where a console or a processor has detected the connection of the input of the dedicated transmission path for reception (input), the confirmation completion message is transmitted and the processing is carried out in another console or processor in response to the completion of the loop connection and, together with this, the completion of the loop connection is confirmed by the reception of the confirmation completion message that it has transmitted.

In this case, it may be set up such that when the confirmation completion message that has been transmitted by the unit itself cannot be received within a specified period of time, it is taken to mean that the loop connection has not been completed and a message is transmitted with which the confirmation completion message that the unit itself has transmitted is voided.

In addition, in the above-mentioned preferred embodiment, it is set up such that the completion of the loop connection is confirmed following the detection of the connection of the dedicated transmission path for reception (input), however, this is not limited to this.

For example, under a condition where any of the transmission paths has been disconnected, if it is set up such that one of the consoles or the processors periodically transmits a special message, when the loop connection has been completed, the message that was transmitted is the one that is received by the unit itself. In this manner, it may be set up such that the reception of the message that has been transmitted is handled as detection data and a confirmation completion message or a connection message is transmitted.

In addition, in the above-mentioned preferred embodiment, it is set up such that in the case where it has been confirmed that the loop connection has been completed, the values of the control parameters that correspond to the current state of the operators of the remote fader 20 are transmitted, however, this is not limited to this.

For example, it may be set up such that when the remote fader 20 is operated, the new state of the operator is stored and, in the case where the completion of the loop connection has been confirmed, the remote fader 20 operator state that has been stored is transmitted. It may also be set up such that one remote fader 20 is provided for a plurality of control parameters in common, the control of any of the control parameters is directed by that remote fader 20 and this method is used in the case where the processors 14 are controlled.

In addition, in the above-mentioned preferred embodiment, the transmission path 16 and the transmission path 18 are used with conductors that conform to AES-EBU, which is an existing format, however, it does not matter which form is used as long as it is a transmission form with which the digital control signals can be transmitted. For example, one such as SPDIF optical cable may be used.

Since the present invention is configured as has been explained above, it exhibits the advantageous result that, for a mixing system that is configured such that the audio control apparatus that directs the control of an audio signal and the audio processing apparatus that mixes and processes the audio signals based on the control instructions from said audio control apparatus are physically separated and which is also configured such that the audio control apparatus and the audio processing apparatus are connected via a transmission path and, together with this, it is possible to place the two separately in different locations, when the transmission path that was disconnected is reconnected, it is possible to carry out processing in which the control parameters for setting the audio processing apparatus are transmitted to the audio processing apparatus from the audio control apparatus and processing with which visual confirmation that the connection has been made again is provided to the user.

What is claimed is:

1. An audio mixing system for use in performance venues, the audio mixing system comprising:

one or more audio control apparatuses for generating control instructions to control audio signals;

one or more audio processing apparatuses for mixing and processing the audio signals based on the control instructions, the one or more audio control apparatuses and the one or more audio processing apparatuses physically separable from each other; and a plurality of transmission paths configured in a loop for connecting the one or more audio control apparatuses and the one or more audio processing apparatuses, the plurality of transmission paths including a transmitting path and a receiving path for communicating the control instructions and audio signals through the loop in a single direction;

wherein each audio control apparatus comprises a first clock detector for detecting a disconnection between the receiving path and the audio control apparatus, and a first message generator for transmitting a disconnection message to other audio control apparatuses and audio processing apparatuses over the transmitting path when a disconnection of the receiving path has been detected by the first clock detector.

2. An audio mixing system as recited in claim 1, each audio control apparatus further including:

a first message receiver for receiving disconnection messages; and a display device for displaying an indication of disconnection when a disconnection message is received by the first message receiver.

3. An audio mixing system as recited in claim 2, wherein the first message generator is capable of re-transmitting disconnection messages received by the first message receiver.

4. An audio mixing system as recited in claim 1, each audio processing apparatus comprising:

a second clock detector for detecting a disconnection between the receiving path and the audio processing apparatus; and a second message generator for transmitting a disconnection message to other audio control apparatuses and audio processing apparatuses over the transmitting path when a disconnection of the receiving path has been detected by the second clock detector.

5. An audio mixing system as recited in claim 4, each audio processing apparatus further including a second message receiver for receiving disconnection messages;

wherein the second message generator is capable of re-transmitting disconnection messages received by the second message receiver.

6. An audio mixing system for use in performance venues, the audio mixing system comprising:

one or more audio control apparatuses for generating control instructions to control audio signals;

one or more audio processing apparatuses for mixing and processing the audio signals based on the control instructions, the one or more audio control apparatuses and the one or more audio processing apparatuses physically separable from each other; and a plurality of transmission paths configured in a loop for connecting the one or more audio control apparatuses and the one or more audio processing apparatuses, the plurality of transmission paths including a transmitting path and a receiving path for communicating the control instructions and audio signals through the loop in a single direction;

wherein each audio control apparatus comprises a first message generator for transmitting a first connection signal over the transmitting path, and a first message receiver for detecting that a loop connection of the plurality of transmission paths has been completed by subsequently receiving the first connection signal on the receiving path.

7. An audio mixing system as recited in claim 6, each audio control apparatus further including:

a control signal generator for changing a control state in conformance with an operation of a specified operator, transmitting a first control instruction signal for executing first control instructions in conformance with the changed control state over the transmitting path, and transmitting a second control instruction signal for executing second control instructions in conformance with a most recent control state when the first connection signal is received by the first message receiver.

8. An audio mixing system as recited in claim 6, each audio control apparatus further including a display device for displaying a connection message when the first connection signal has been received by the first message receiver.

9. An audio mixing system as recited in claim 6, wherein the first message generator is capable of transmitting a second connection signal over the transmitting path when the first connection signal has been received by the first message receiver.

10. An audio mixing system as recited in claim 6, each audio processing apparatus comprising:

a second message generator for transmitting a third connection signal over the transmitting path; and a second message receiver for detecting that a loop connection of the plurality of transmission paths has been completed by subsequently receiving the third connection signal on the receiving path;

wherein the second message generator is capable of transmitting a fourth connection signal over the transmitting path when the third connection signal has been received by the second message receiver.

11. In an audio mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, a method for monitoring and controlling the audio mixing system, the method comprising the steps of:

detecting a disconnection between the receiving path and an audio control apparatus; and transmitting a disconnection message to the one or more audio control apparatuses and the one or more audio processing apparatuses over the transmitting path when a disconnection between the receiving path and an audio control apparatus has been detected.

12. A method for monitoring and controlling audio mixing systems as recited in claim 11, the method further including the steps of:

receiving disconnection messages at an audio control apparatus; and displaying an indication of disconnection at the audio control apparatus when a disconnection message is received by the audio control apparatus.

13. A method for monitoring and controlling audio mixing systems as recited in claim 12, further including the step of re-transmitting disconnection messages received by the audio control apparatus.

14. A method for monitoring and controlling audio mixing systems as recited in claim 11, further including the steps of:

detecting a disconnection between the receiving path and an audio processing apparatus; and transmitting a disconnection message to other audio control apparatuses and audio processing apparatuses over the transmitting path when a disconnection between the receiving path and an audio processing apparatus has been detected.

15. A method for monitoring and controlling audio mixing systems as recited in claim 14, further including the steps of:

receiving disconnection messages at the audio processing apparatus; and retransmitting disconnection messages received by the audio processing apparatus.

16. In an audio mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, a method for monitoring and controlling the audio mixing system, the method comprising the steps of:

transmitting a first connection signal from an audio control apparatus over the transmitting path; and detecting that a loop connection of the plurality of transmission paths has been completed by subsequently receiving the first connection signal at the audio control apparatus on the receiving path.

17. A method for monitoring and controlling audio mixing systems as recited in claim 16, the method further including the steps of:

changing a control state in conformance with an operation of a specified operator;

transmitting a first control instruction signal for executing first control instructions in conformance with the changed control state over the transmitting path; and transmitting a second control instruction signal for executing second control instructions in conformance with a most recent control state when the first connection signal is received at the audio control apparatus.

18. A method for monitoring and controlling audio mixing systems as recited in claim 16, further including the step of displaying a connection message when the first connection signal has been received by the audio control apparatus.

19. A method for monitoring and controlling audio mixing systems as recited in claim 16, further including the step of transmitting a second connection signal over the transmitting path when the first connection signal has been received by the audio control apparatus.

20. A method for monitoring and controlling audio mixing systems as recited in claim 16, further including the steps of:

transmitting a third connection signal from the audio processing apparatus over the transmitting path;

detecting that a loop connection of the plurality of transmission paths has been completed by subsequently receiving the third connection signal at the audio processing apparatus on the receiving path; and transmitting a fourth connection signal from the audio processing apparatus over the transmitting path when the third connection signal has been received by the audio processing apparatus.

21. In an audio mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio control apparatus is disclosed, comprising:

a clock detector for detecting a disconnection between the receiving path and the audio control apparatus; and a message generator for transmitting a disconnection message to other audio control apparatuses and audio processing apparatuses over the transmitting path when a disconnection of the receiving path has been detected by the clock detector.

22. The audio control apparatus as recited in claim 21, further including:

a message receiver for receiving disconnection messages; and a display device for displaying an indication of disconnection when a disconnection message is received by the message receiver.

23. The audio control apparatus as recited in claim 22, wherein the message generator re-transmits disconnection messages received by the message receiver.

24. In an audio mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio processing apparatus is disclosed, comprising:

a clock detector for detecting a disconnection between the receiving path and the audio processing apparatus; and a message generator for transmitting a disconnection message to other audio control apparatuses and audio processing apparatuses over the transmitting path when a disconnection of the receiving path has been detected by the clock detector.

25. An audio processing apparatus as recited in claim 24, further including a message receiver for receiving disconnection messages;

wherein the message generator re-transmits disconnection messages received by the message receiver.

26. In an audio mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio control apparatus is disclosed, comprising:

a message generator for transmitting a first connection signal over the transmitting path;

a message receiver for detecting that a loop connection of the plurality of transmission paths has been completed by subsequently receiving the first connection signal on the receiving path; and a control signal generator for changing a control state in conformance with an operation of a specified operator, transmitting a first control instruction signal for executing first control instructions in conformance with the changed control state over the transmitting path, and transmitting a second control instruction signal for executing second control instructions in conformance with a most recent control state when the first connection signal is detected by the message receiver.

27. An audio control apparatus as recited in claim 26, further including a display device for displaying a connection message when the first connection signal has been received by the message receiver.

28. An audio control apparatus as recited in claim 27, wherein the message generator is capable of transmitting a second connection signal over the transmitting path when the first connection signal has been received by the message receiver.

29. In an audio mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio processing apparatus is disclosed, comprising:

a message generator for transmitting a first connection signal over the transmitting path; and a message receiver for detecting that a loop connection of the plurality of transmission paths has been completed by subsequently receiving the first connection signal on the receiving path;

wherein the message generator is capable of transmitting a second connection signal over the transmitting path when the first connection signal has been received by the message receiver.

30. In a mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio control apparatus is disclosed, comprising:

a detection means for detecting a disconnection between the receiving path and the audio control apparatus; and a notification means for notifying other audio control apparatuses and audio processing apparatuses over the transmitting path when a disconnection of the receiving path has been detected by the detection means.

31. In a mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio control apparatus is disclosed, comprising:

a receiving means for receiving notifications of disconnections through the receiving path; and a display means for displaying a disconnection message when a notification of disconnection is received by the receiving means.

32. In a mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio control apparatus is disclosed, comprising:

a receiving means for receiving notifications of disconnections through the receiving path; and a notification means for notifying other audio control apparatuses and audio processing apparatuses over the transmitting path when a notification of disconnection has been received by the receiving means.

33. In a mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio processing apparatus is disclosed, comprising:

a detection means for detecting a disconnection between the receiving path and the audio control apparatus; and a notification means for notifying other audio control apparatuses and audio processing apparatuses over the transmitting path when a disconnection of the receiving path has been detected by the detection means.

34. An audio processing apparatus as recited in claim 33, further including:

a receiving means for receiving notifications of disconnections through the receiving path; and a notification means for notifying other audio control apparatuses and audio processing apparatuses over the transmitting path when a notification of disconnection has been received by the receiving means.

35. In a mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop, the plurality of transmission paths including a transmitting path and a receiving path for communicating the control instructions and audio signals through the loop in a single direction, an audio control apparatus is disclosed, comprising:

a detection means for transmitting a connection signal over the transmitting path, and detecting that a loop connection of the plurality of transmission paths has been completed by subsequently receiving the connection signal on the receiving path;

a change instruction means for changing a control state in conformance with an operation of a specified operator, and transmitting a first control instruction signal for executing first control instructions in conformance with the changed control state over the transmitting path; and a transmission means for transmitting a second control instruction signal for executing second control instructions in conformance with a most recent control state when the connection signal that indicates the loop connection of the plurality of transmission paths has been completed is detected by the detection means.

36. In a mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop within which the control instructions and audio signals are transmittable in a single direction, an audio control apparatus is disclosed, comprising:

a detection means for transmitting a connection signal over the transmitting path, and detecting that a loop connection of the plurality of transmission paths has been completed by subsequently receiving the connection signal on the receiving path; and a display means for displaying a connection message when the connection signal has been received by the detection means.

37. In a mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop within which the control instructions and audio signals are transmittable in a single direction, an audio control apparatus is disclosed, comprising:

a detection means for transmitting a first connection signal over the transmitting path, and detecting that a loop connection of the plurality of transmission paths has been completed by subsequently receiving the first connection signal on the receiving path; and a transmission means for transmitting a second connection signal over the transmitting path when the first connection signal has been received by the detection means.

38. In a mixing system having one or more audio control apparatuses for generating control instructions to control audio signals and one or more audio processing apparatuses for mixing and processing the audio signals based on the control instructions, the one or more audio control apparatuses and the one or more audio processing apparatuses physically separable from each other but connectable through a plurality of transmission paths in a loop within which the control instructions and audio signals are transmittable in a single direction, an audio processing apparatus is disclosed, comprising:

a detection means for transmitting a first connection signal over the transmitting path, and detecting that a loop connection of the plurality of transmission paths has been completed by subsequently receiving the first connection signal on the receiving path; and transmission means for transmitting a second connection signal over the transmitting path when the first connection signal has been received by the detection means.

* * * * *